US006658475B1

(12) United States Patent
Ueno

(10) Patent No.: US 6,658,475 B1
(45) Date of Patent: Dec. 2, 2003

(54) METHOD AND DEVICE FOR INITIALIZING A WIRELESS NETWORK USING A PLURALITY OF CONTROLLED DEVICES

(75) Inventor: Masatoshi Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/381,768

(22) PCT Filed: Jan. 22, 1999

(86) PCT No.: PCT/JP99/00240

§ 371 (c)(1),
(2), (4) Date: Feb. 15, 2000

(87) PCT Pub. No.: WO99/38290

PCT Pub. Date: Jul. 29, 1999

(30) Foreign Application Priority Data

Jan. 23, 1998 (JP) ............................... 10/11020

(51) Int. Cl.[7] .................. G06F 15/16; G06F 15/173
(52) U.S. Cl. .................. 709/229; 709/250; 709/226; 709/228
(58) Field of Search ................ 709/250, 226, 709/228–229, 220

(56) References Cited

U.S. PATENT DOCUMENTS 5,974,236 A * 10/1999 Sherman ............... 709/221
5,991,828 A * 11/1999 Horie et al. ........... 709/220
6,134,587 A * 10/2000 Okanoue ............... 709/222
6,175,571 B1 * 1/2001 Haddock et al. ....... 370/423
6,321,270 B1 * 11/2001 Crawley ................ 709/238
6,510,153 B1 * 1/2003 Inoue et al. ........... 370/354

FOREIGN PATENT DOCUMENTS

| JP | 06-104902 | * 4/1994 |
| JP | 07-283828 | * 10/1995 |
| JP | 09-330284 | * 12/1997 |

* cited by examiner

Primary Examiner—David Wiley
Assistant Examiner—Joseph E Avellino
(74) Attorney, Agent, or Firm—Jay H. Maioli

(57) ABSTRACT

A control device preferably applied to a wireless network in which a control node 2 holds a predetermined number of node IDs (bus IDs) to be allocated to the controlled nodes 3 to 6 which are newly connected to the network. The control node allocates a node ID not yet allocated among the held node IDs to a controlled node when the controlled node is newly connected to the network, and deallocates the node ID allocated to the controlled node when the controlled node is removed from the network. Thus, the control device may grasp the configuration of the whole network easily when the controlled node is connected to and removed from the network, eliminating a need for resetting the whole network.

8 Claims, 15 Drawing Sheets

FIG. 3
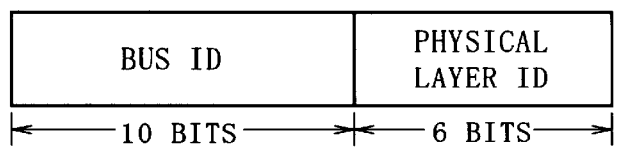
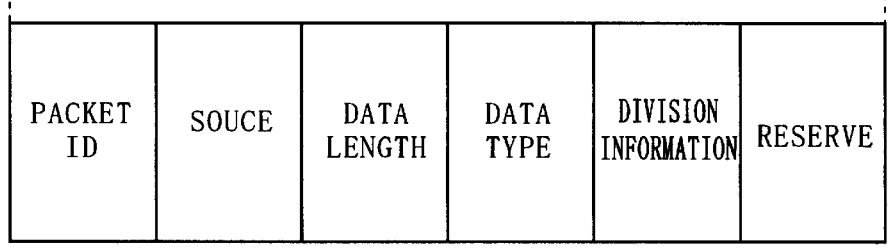
FIG. 7A
FIG. 7B
FIG. 7C

| RADIO COMMUNICATION ID | NODE ID (BUS ID) | FIRST STORAGE AREA (USE FLAG) | SECOND STORAGE AREA (FREQUENCY INFORMATION) |
|---|---|---|---|
| 0 0 1 | A | 1 | 1 1 (HIGH) |
| 0 1 0 | B | 1 | 1 0 (NOMAL) |
| 0 1 1 | C | 1 | 0 0 (LOW) |
| 1 0 0 | D | 0 | 0 0 |
| 1 0 1 | E | 0 | 0 0 |
| 1 1 0 | F | 0 | 0 0 |
| 1 1 1 | G | 1 | 1 0 |

METHOD AND DEVICE FOR INITIALIZING A WIRELESS NETWORK USING A PLURALITY OF CONTROLLED DEVICES

TECHNICAL FIELD

This invention relates to a control device, a control method, a radio communication apparatus and computer-readable medium, which are preferably applied to, for example, a wireless network.

BACKGROUND ART

With advances in the widespread use of portable devices such as a notebook personal computer, an electronic pocketbook, various analog and digital interfaces have made progress in wireless form and speed-up in recent years. In regard to computer fields in particular, wireless and speed-up efforts grow widespread. A construction of a non-contact connection-based network has been put forward between portable devices as well as tabletop devices by using techniques typified by a wireless LAN (local area network) and IrDA (infrared data association).

For example, the wireless LAN makes it possible to provide communications between a plurality of nodes through the use of an access control protocol called "CSMA (carrier sense multiple access)". Further, for example, the IrDA allows communications to be made between two nodes through the use of an access control protocol called "IrLAP (infrared link access protocol)".

However, when such recent high-speed serial buses as typified by a USB (universal serial bus), an IEEE1394, etc., are brought into wireless form, these access techniques cannot be utilized as they are. As already well known, these high-speed serial buses support a transfer system called, an isochronous transfer to transfer data of applications placing importance on real time, such as AV (audio-visual) data. This isochronous transfer is a transfer method for assuring a transfer width and time of data thereby to implement a transfer of a predetermined amount of data in a predetermined cycle, which is of importance to the real time transfer of a device.

In order to implement such a transfer method with a wireless network constructed by a plurality of nodes, frequent switching between outgoing or sending nodes is required to ensure transfer widths and transfer time intervals of each individual data sent from the plurality of nodes. Therefore, the access control protocol of the above-described IrLAP used in a one-to-one relationship cannot be used as it is. Further, the access control protocol called the above-described CSMA for detecting a state of non-use of a space and thereafter ensuring the corresponding transfer width cannot be used either as it is.

In order to implement the isochronous transfer of the high-speed serial bus such as USB or IEEE1394 by wireless, the frequent switching between the sending nodes is needed as described above and a network structure is required in which one node takes charge of sending or outgoing control and information management.

Further, these high-speed serial buses respectively have the function of being capable of changing their states with power-on. Since one input/output plug generally bears one connection when nodes are connected to one another with a cable, a change in connection can be recognized based on a change in the electric characteristic of the plug. In the case of a wireless connection, however, there is a high possibility that one input/output device will bear a plurality of connections. Thus, the device encounters difficulties in recognizing each connection change by a change in the electric characteristic.

Further, when a number of nodes connected to a serial bus are changed in the IEEE1394, a reset processing of network configuration called "bus reset" is carried out. In this case, during this reset processing, all the streams of packets sent to and received from the network are required to stop. Thus, a user cannot use this network during such a period.

It is conceivable that, as the portable devices used in wireless network have such a property that they can be easily carried, they might be newly entered into the already established network when they are powered on or they might be carried out of an area enabling a communication when they are already connected with the network. In this case, there increases or decreases the number of devices connected with the network, the network needs carry out a reset processing to grasp the configuration of the whole network. Thus, this brings about the similar problem in the case described above that the network cannot be used during such a reset period.

An object of the present invention is to eliminate the need for resetting the whole network when there increases or decreases the number of devices connected with the network.

DISCLOSURE OF THE INVENTION

A control device according to this invention is a control device for controlling pieces of controlled apparatus performing communications within a network, comprising a holding means for holding a predetermined number of identifier to be allocated to the controlled apparatus connected with the network, and an allocating means for allocating the identifier not yet allocated among the identifiers held in the holding means, when the controlled apparatus is newly entered into the network, to the controlled apparatus. Another control device according to this invention is a control device further comprising deallocating mans for deallocating the identifier allocated to the controlled apparatus when the controlled apparatus is removed from the network.

A control method according to the invention is a control method of a control device for controlling pieces of controlled apparatus performing communications within a network, comprising a holding step for holding a predetermined number of identifier to be allocated to the controlled apparatus connected with the network, and an allocating step for allocating the identifier not yet allocated among the identifiers held in the holding step, when new controlled apparatus is connected with into the network, to the new controlled apparatus. Another control method according to this invention is a control method further comprising deallocating step for deallocating the identifier allocated to the controlled apparatus when the controlled apparatus is removed from the network.

A computer-readable medium according to the invention is a computer-readable medium for recording a program for allowing a computer in a control device for controlling pieces of controlled apparatus performing communications within a network to carry out a holding step for holding a predetermined number of identifier to be allocated to the controlled apparatus connected with the network, and an allocating step for allocating the identifier not yet allocated among the identifiers held in the holding step, when new controlled apparatus is connected with the network, to the new controlled apparatus. Another computer-readable medium according to the invention is a computer-readable medium for further recording a program for allowing a computer to carry out deallocating step for deallocating the identifier allocated to the controlled apparatus when the controlled apparatus is removed from the network.

Further, a radio communication apparatus according to this invention is a radio communication apparatus comprising one control device and one or more pieces of controlled apparatus controlled by the control device and performing communications between the respective device and apparatus by radio, wherein the control device includes a holding means for holding a predetermined number of identifier to be allocated to the controlled apparatus, and an allocating means for allocating the identifier not yet allocated among the identifiers held in the holding means, when new controlled apparatus is entered into the network, to the new controlled apparatus.

In the present invention, the control device (a control apparatus) for controlling pieces of controlled apparatus performing communications within a network, holds a predetermined number of identifier to be allocated to the controlled apparatus connected with the network. Further, the control device allocates the identifier not yet allocated among the held identifiers, when the controlled apparatus is newly entered into the network, to the controlled apparatus and deallocates the identifier allocated to the controlled apparatus when the controlled apparatus is removed from the network. Thus, the control device may grasp the configuration of the whole network easily when the controlled apparatus is entered into and removed from the network and then, this eliminates the needs for resetting the whole network.

BRIEF DESCRIPTION OF THE DRAWINGS

FIG. 3 is a diagram for explaining a configuration of the node ID;

FIGS. 7A to 7C are respectively diagrams depicting the type of data block and the contents of each header;

BEST MODE FOR CARRYING OUT THE INVENTION

Figure 1:
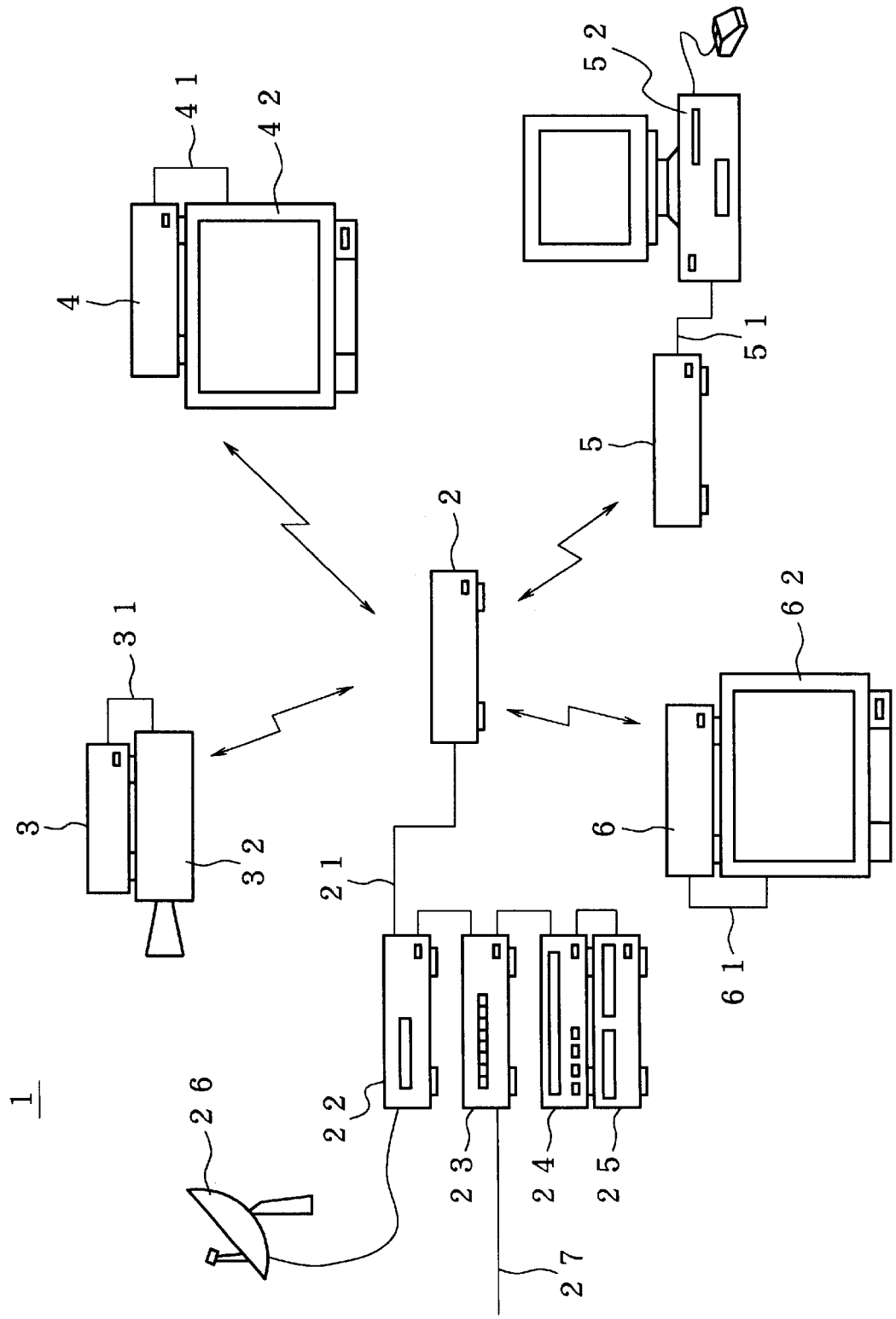
FIG. 1 is a systematic diagram showing a wireless network illustrated as an embodiment.

FIG. 1 shows an example of a configuration of a wireless network 1 using infrared rays as a radio communication medium. The present network 1 has five wireless network nodes (hereinafter called [WN nodes]) 2 through 6.

The WN node 2 is electrically connected to an IEEE1394 bus 21. Further, a satellite broadcasting receiver 22, a receiving device (set top box) 23 for CATV (cable television), a digital video disk (DVD) device 24 and a videocassette recorder (VCR) 25 are electrically connected to the bus 21 as IEEE1394 nodes. Incidentally, an antenna 26 for receiving a satellite-broadcasting signal is electrically connected to the satellite-broadcasting receiver 22. A cable 27, through which a CATV signal is transmitted, is electrically connected to the CATV set top box 23.

The WN node 3 is electrically connected to an IEEE1394 bus 31. Further, a video camera 32 used as an IEEE1394 node is electrically connected to the bus 31. The WN node 4 is electrically connected to an IEEE1394 bus 41. A monitor 42 used as an IEEE1394 node is electrically connected to the bus 41.

The WN node 5 is electrically connected to an IEEE1394 bus 51. Further, a computer 52 used as an IEEE1394 node is electrically connected to the bus 51. The WN node 6 is electrically connected to an IEEE1394 bus 61. Further, a monitor 62 used as an IEEE1394 node is electrically connected to the bus 61.

When data is transferred from a first node connected to a given WN node to a second node connected to another WN node in the wireless network 1 shown in FIG. 1, the data is converted to an infrared-ray signal and then the converted infrared-ray signal is transferred.

Incidentally, in the IEEE1394 Standard, up to sixty-three nodes can be connected to the IEEE1394 bus. Node ID is composed of a bus ID (BUS_ID; 10 bits) indicating the bus to which the node is connected, and a physical layer ID (PHY_ID; 6 bits), which is a serial number in the bus. Therefore, the maximum number of buses able to be connected to the network is 1023. Bus ID of each node having not yet set up (for example, when the power is turned on) is set to an initial value (3FF). Further, unique device IDs other than the node ID are previously allocated to all of the nodes.

Figure 4:
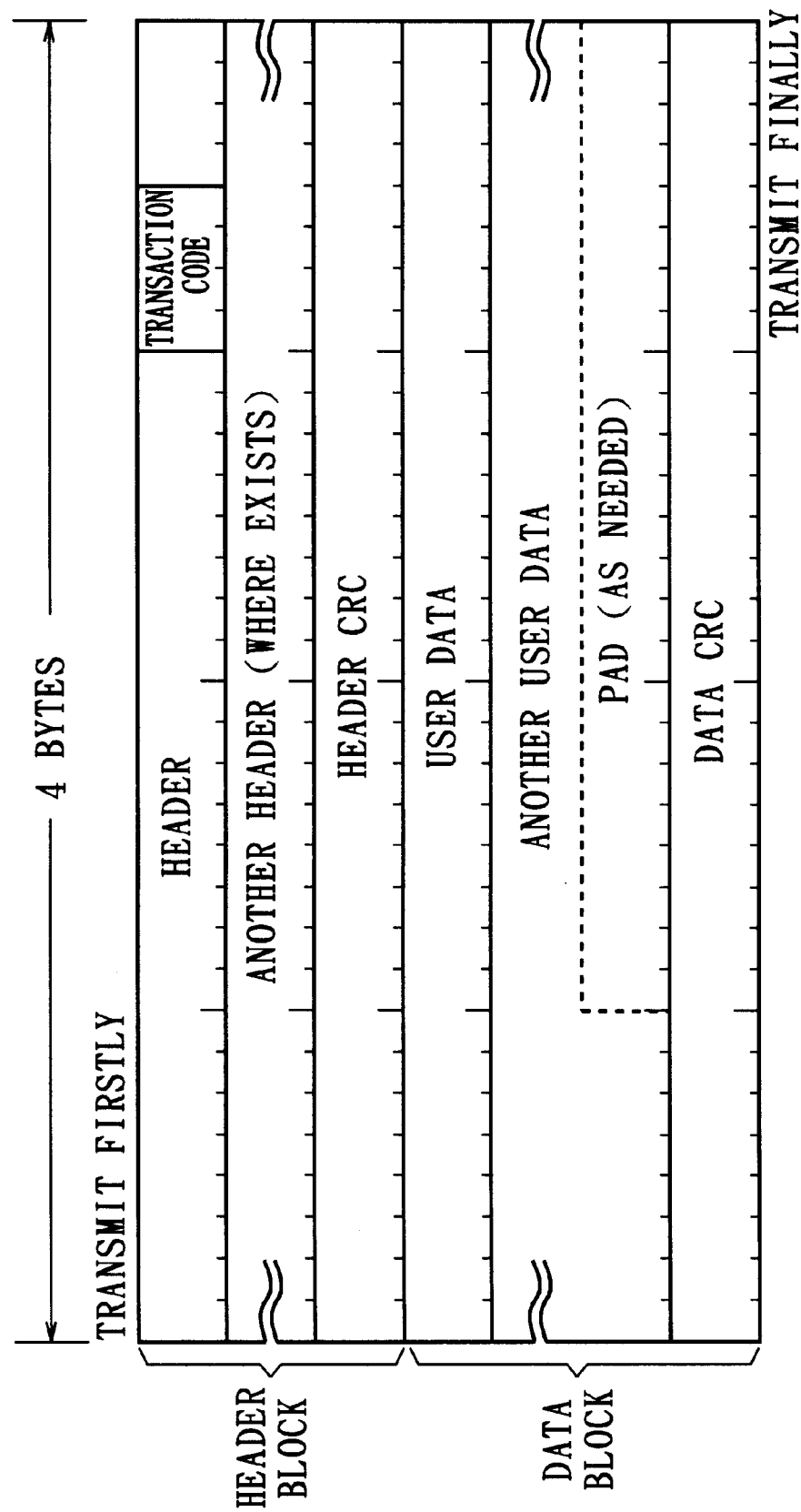
FIG. 4 is a diagram showing a basic format of a packet compliant with the IEEE1394 Standard.

On the other hand, in the IEEE1394 Standard, data is transferred with a packet as a unit. FIG. 4 shows a data format at the execution of data communications compliant with the IEEE1394 Standard, i.e., a basic format of a packet. That is, the packet roughly comprises a header, a transaction code (tcode), a header CRC, user data, and data CRC. The header CRC is produced based on a header alone. In the IEEE1394 Standard, a node is defined so as to prohibit a header, which fails to pass a check of the header CRC, from performing an action thereon and responding thereto. In the IEEE1394 Standard as well, the header must contain the transaction code. The transaction code will define the classification of a principal packet.

Further, in the IEEE1394 Standard, an isochronous (synchronous) packet and an asynchronous (non-synchronous) packet are known as derivatives of the packet shown in FIG. 4. They are distinguished from each other by the transaction code.

Figure 5:
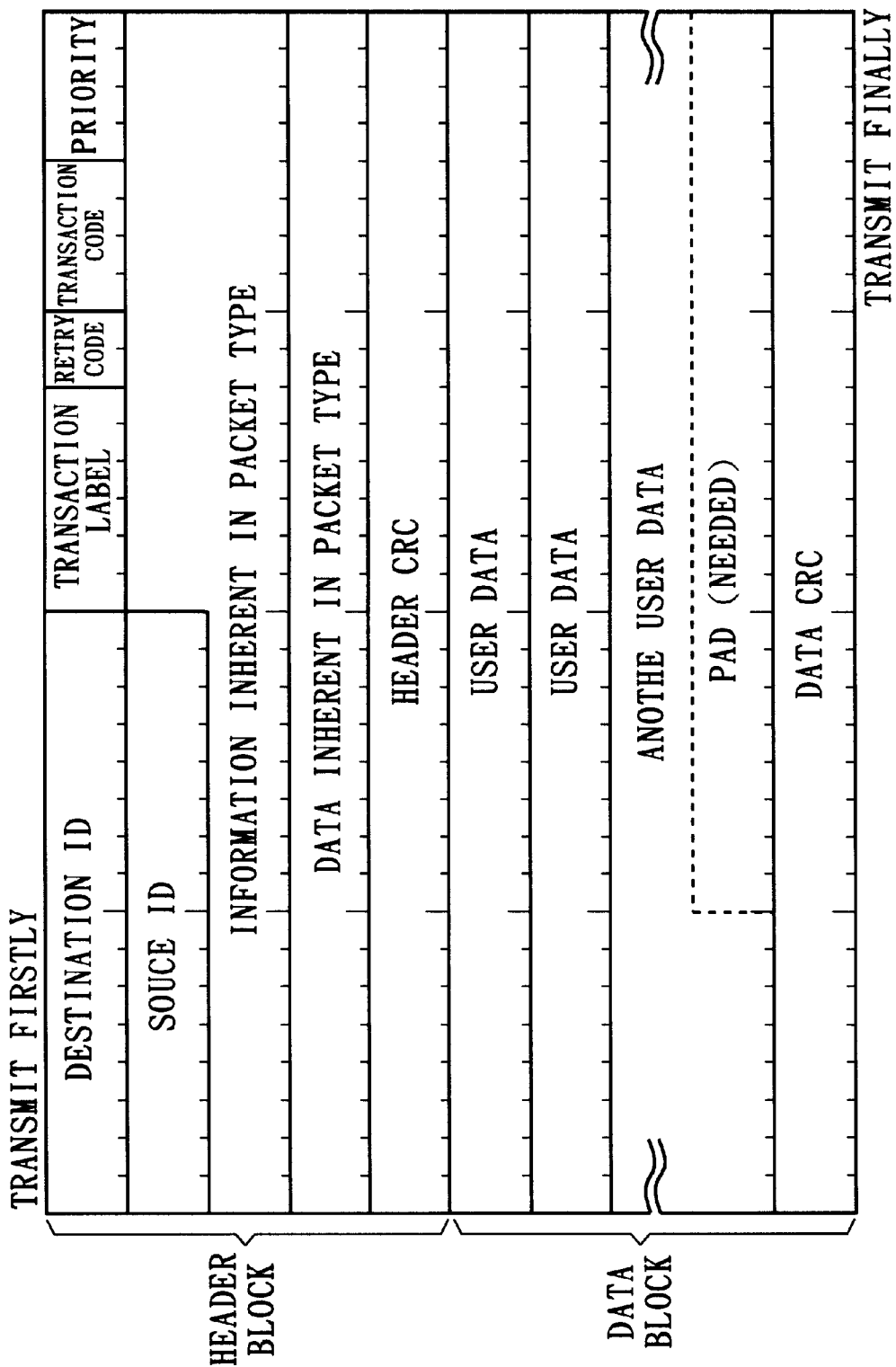
FIG. 5 is a diagram illustrating a data format of an asynchronous packet compliant with the IEEE1394 Standard.

FIG. 5 shows a data format of the asynchronous packet. In the asynchronous packet, a header comprises an identifier (destination_ID) for a destination node, a transaction label (tl), a retry code (rt), a transaction code (tcode), priority information (pri), an identifier (source_ID) for a source node, information (destination_offset, rcode, reserved) inherent in packet type, data (quadlet_data, data_length, extended_tcode) inherent in packet type, and a header CRC.

Figure 6:
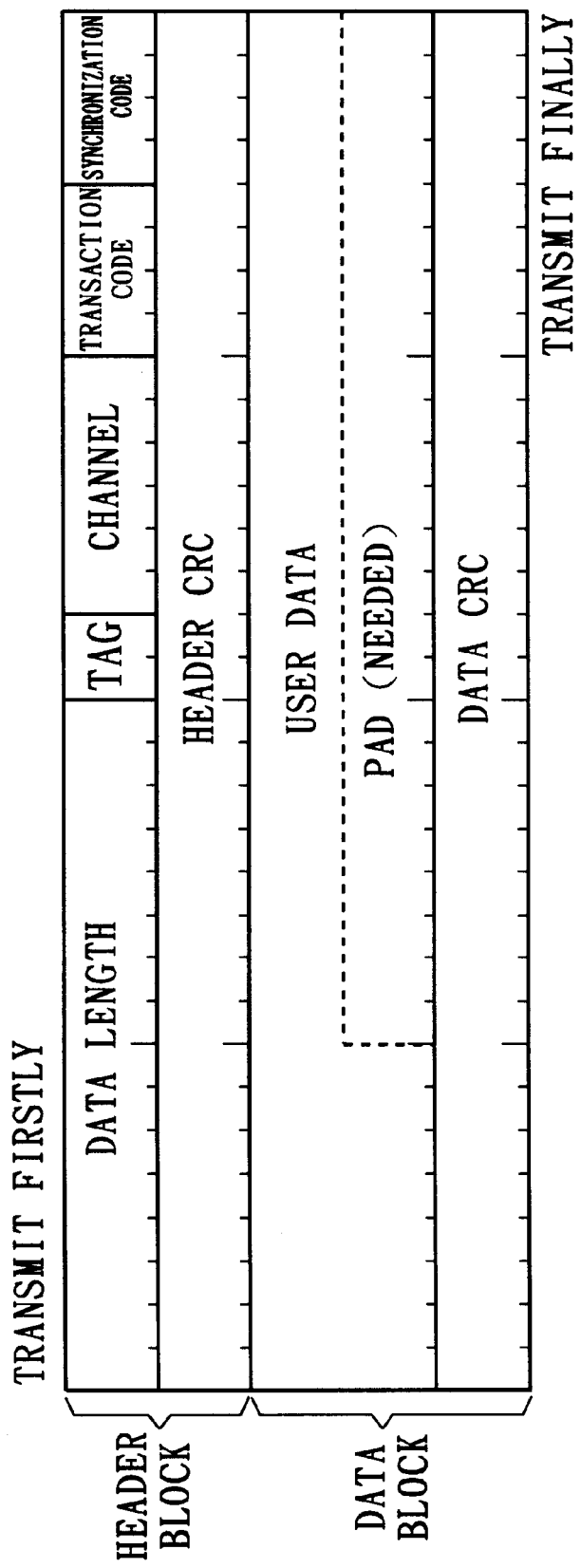
FIG. 6 is a diagram illustrating a data format of an isochronous packet compliant with the IEEE1394 Standard.

FIG. 6 shows a data format of the isochronous packet. In the isochronous packet, a header comprises a data length (data_length), a format tag (tag) of isochronous data, an isochronous channel (channel), a transaction code (tcode), a synchronization code (sy), and a header CRC.

The above-described packets (isochronous packet, asynchronous packet) compliant with the IEEE1394 Standard can be varied in length as already known. In the present embodiment, however, data is transferred from a certain WN node to another WN node with a data block having a fixed length as a unit. Therefore, each of the WN nodes employed in the present embodiment creates a fixed-length data block from packet data such as an isochronous packet, an asynchronous packet based on the IEEE1394.

When the length of a variable-length packet is now longer than that of the fixed-length data block, the corresponding packet is divided into plural form and then data in the corresponding packet is set so as to be contained in a plurality of data blocks. In this case, three types of data blocks are created as the fixed-length data blocks.

The first one is a data block having user data comprised of only data including one packet as shown in FIG. 7A. In this data block, a header is placed in front of the user data and error-correcting parity (ECC:Error Correction Code) with respect to the header and the user data is provided. The second one is a data block having user data comprised of data including a plurality of packets (two packets in the illustrated example) as shown in FIG. 7B. In this data block, headers are respectively placed in front of the user data, and error-correcting parity with respect to the headers and user data as a whole is placed.

The third one is a data block as shown in FIG. 7C, which has user data comprised of data including one or a plurality of packets (one packet in the illustrated example) and is added with 0 data (empty data) within its space area. In this data block, a header is placed in front of the user data and error-correcting parity with respect to the header, user data and 0 data as a whole is provided.

Incidentally, when the transmission rate of the data block is given as 24.576 Mbps, the parity is made up of 8 bytes and the others are comprised of 52 bytes. Further, the data block is QPSK-modulated so as to be transferred as data having 240 symbols. On the other hand, when the transmission rate is given as 2×24.576 Mbps, the parity is made up of 16 bytes and the others consist of 104 bytes. Further, the data block is 16-QAM-modulated so as to be transferred as data having 240 symbols. Further, when the transmission rate is given as 4×24.576 Mbps, the parity is made up of 32 bytes and the others are comprised of 208 bytes. Further, the data block is 256-QAM-modulated so as to be transferred as data having 240 symbols.

Further, the header is made up of 4 bytes and has a packet ID area, a source ID area, a data-length information area, a data-type information area, a division information area, and a reserve area, as shown in FIG. 7A. For example, a 7-bit packet ID is stored in the packet ID area. In this case, the original packet is identified by using ⌈1⌉st through ⌈127⌉th packet ID in order. After the use of the ⌈127⌉th packet ID, they are used again from the ⌈1⌉st packet ID in order. A radio communication ID for a WN node corresponding to the origin of transmission is stored in the source ID area. When the wireless network is constructed of seven WN nodes at maximum, the radio communication ID is defined as 3-bit data, for example. Incidentally, a radio communication ID of a control node is defined as ⌈1⌉.

Figure 8:
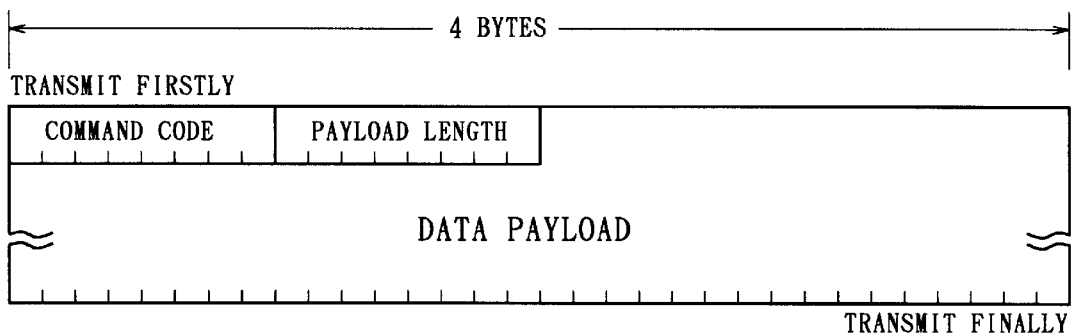
FIG. 8 is a diagram showing a data format of an access-layer-command.

Information indicative of the length of user data is stored in the data-length information area. A code indicative of whether the user data is data having an isochronous packet, data having an asynchronous packet, or data for an access-layer-command, is stored in the data-type information area. When the type of data is given as the access-layer-command, such an access-layer-command having a data format as shown in FIG. 8 is placed within the user data of a data block.

The access-layer-command is used for command communications dedicated between mutual access-layers in order to carry out communications of set information between a WN node defined as a control node and a WN node defined as a node to be controlled. Since the access-layer-command is completed between the access-layers although placed in the user data of the data block, it does not take the packet format compliant with the IEEE1394. A command code indicates the type of access-layer-command. A payload length indicates the length of a command occupied within the user data (payload)l in a byte unit.

An access-layer-command is stored in a data payload. A portion stored in forward-packed form and insufficient for a quadlet (4 bytes) unit is padded with 0 data.

Referring back to FIG. 7A, the information about the division of a packet, such as ⌈non-division⌉, ⌈top of divided packets⌉, ⌈middle of divided packets⌉, ⌈end of divided packets⌉, is stored in the division information area.

Figure 9:
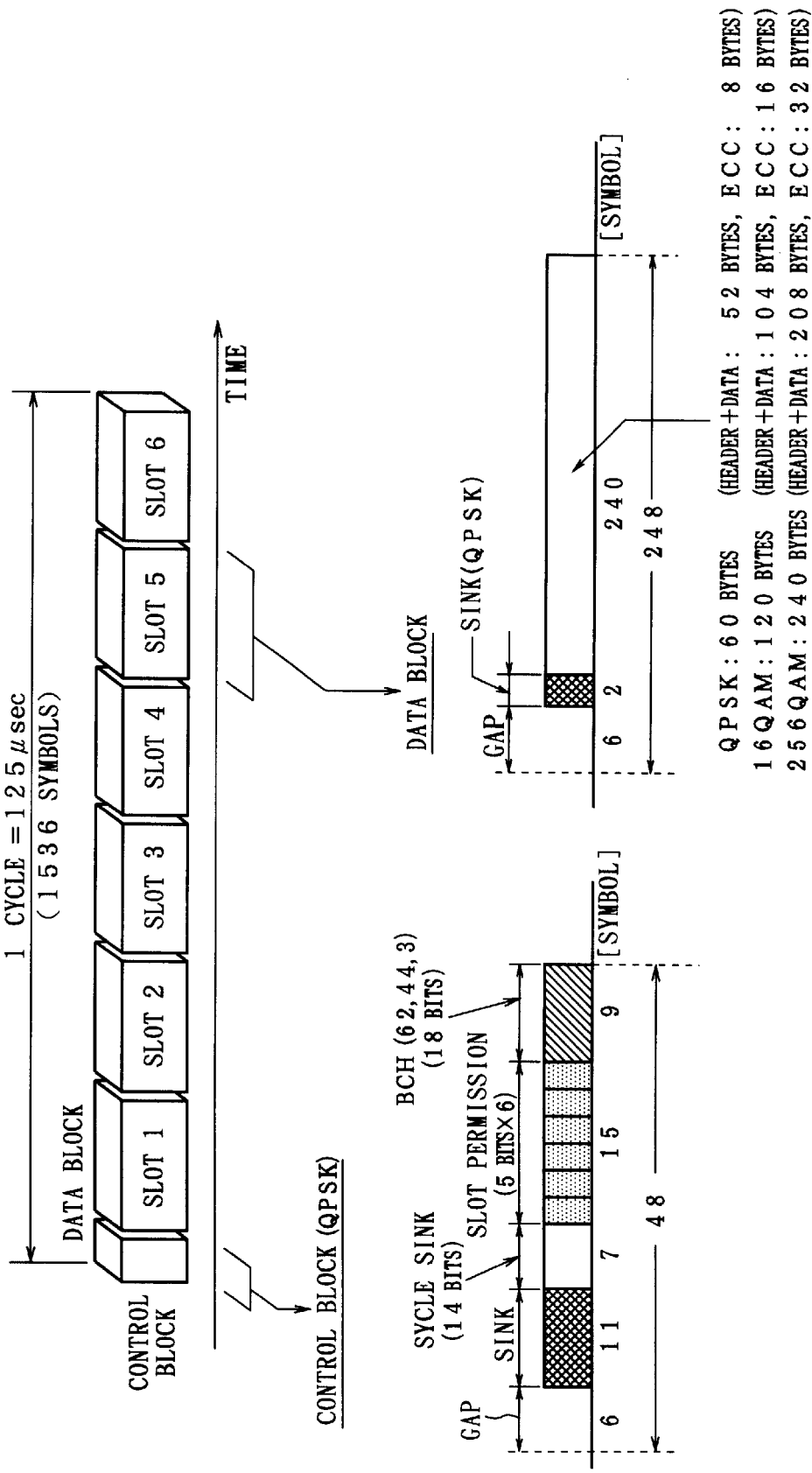
FIG. 9 is a diagram illustrating a radio communication data format using infrared rays.

As described above, the fixed-length data blocks created by the respective WN nodes are transferred through the use of a plurality of time slots provided within continuous respective cycles of 125 μsec. FIG. 9 shows a radio communication data format employed in the present embodiment. Six time slots (time slots 1 through 6) are provided within each cycle. Incidentally, one of the above-described WN nodes 2 through 6 is set so as to operate as a control node as will be described later. The transmission of the respective WN nodes is controlled by the control node.

The WN node activated as the control node sends a control block antecedent to the time slots 1 through 6 within each cycle. The control block is QPSK (Quadrature Phase Shift Keying)-modulated and comprises a gap area corresponding to 6 symbols, a sink area corresponding to 11 symbols, a cycle sink area corresponding to 7 symbols, a slot permission area corresponding to 15 symbols, and an error-correcting area corresponding to 9 symbols.

As will be described later, a node to be controlled performs a process for reproducing a transfer clock signal at a control node from data in the control block and synchronizing its own transfer clock signal with the reproduced transfer clock signal at the control node. Thus, the control block sent from the control node is also used as a clock-synchronizing signal.

A sink for detecting the control block is placed in the sink area. Of 32-bit cycle time data contained in a cycle-start-packet transferred to an IEEE1394 bus once per 125 μsec (isochronous cycle) by an IEEE1394 node called "cycle-master", data corresponding to the twelve lowermost bits is stored in the cycle sink area. Incidentally, an area corresponding to the remaining 2 bits (1 symbol) in the cycle sink area is reserved.

Figure 10:
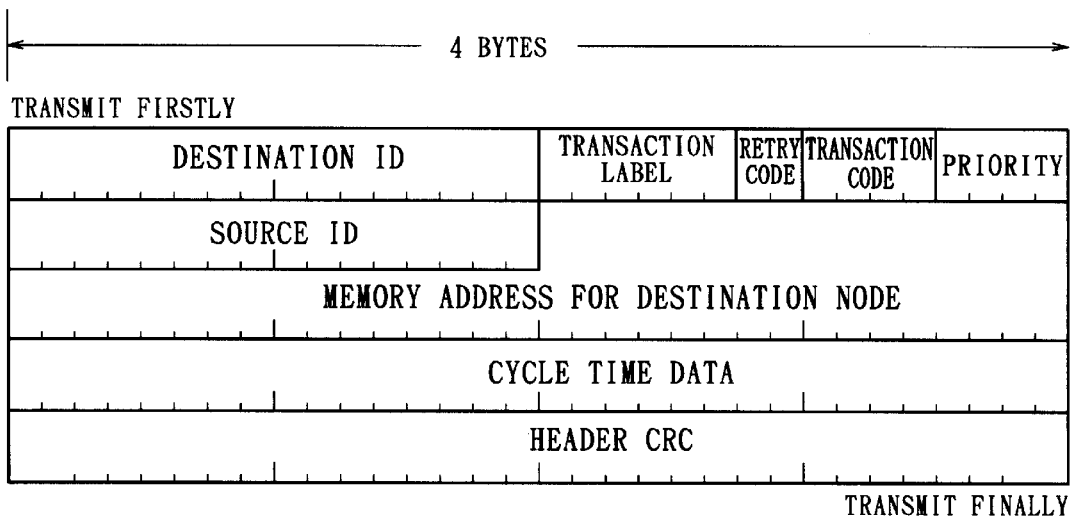
FIG. 10 is a diagram depicting a data format of a cycle start packet compliant with the IEEE1394 Standard.
Figure 11:
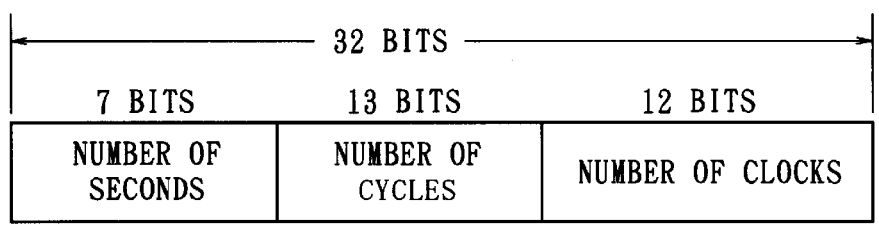
FIG. 11 is a diagram showing a structure of cycle time data.

FIG. 10 shows a data format of the cycle-start-packet. In the cycle-start-packet, a header comprises an identifier (destination_ID) for a destination node, a transaction label (tl), a retry code (rt), a transaction code (tcode), priority information (pri), an identifier (source_ID) for a source node, a memory address (destination_offset) for a destination node, cycle time data, and a header CRC. FIG. 11 shows a structure of 32-bit cycle time data. 7 uppermost bits indicate the number of seconds, 13 bits next to the 7 bits indicate the number of cycles, and 12 lowermost bits indicate a count value (number of clocks) of a clock signal of 24.576 MHz, respectively.

Thus, the WN node used as the controlled node performs a process for extracting the 12-bit data stored in the cycle sink area of the control block and updating cycle time data generated from its own cycle time data generator according to the extracted 12-bit data. As a result, relative time intervals of all the nodes are automatically synchronized at the heads of the respective cycles.

Incidentally, the respective nodes compliant with the IEEE1394 have CSR (Control and Status Registers) defined by ISO/IEC13213. Synchronous data stored in the cycle time register therein is transmitted in a substantially 125 μsec unit thereby to implement synchronization of the corresponding register of each node which performs isochronous transfer. As described above, the cycle time data generated from the cycle time data generator of the controlled node is updated based on the 12-bit data stored in the cycle sink area of the control block sent from the control node in each cycle of 125 μsec. It is thus possible to implement the processing, which is similar to the automatic synchronization processing of each IEEE1394 cycle time register.

Referring back to FIG. 9, 5-bit information about the time slots 1 through 6 is stored in the slot permission area. The 5-bit information comprises bits 0 through 4. When the bit 4 is given as [1], it indicates the transmission of a tone request. When the bit 4 is given as [0], it indicates the transmission of data. The tone request is a request for transmitting a tone signal to control transmission power. When the bit 3 is given as [1], it indicates isochronous data. When the bit 3 is represented as [0], it indicates asynchronous data. The bits 2 through 0 indicate the radio communication ID of WN nodes that permit sending, respectively. Here, the radio communication ID of the WN node used as the control node as described above is represented as [111]. As will be described later, the node ID intended for temporary utilization, which is used to provide an opportunity for sending, is given as [000] with respect to each WN node having no radio communication ID. Thus, any of [001] through [110] is used as a radio communication ID of a WN node used as a controlled node.

An error-correcting code with respect to the cycle sink area and slot permission area is stored in the error-correcting area. A BCH (62, 44, and 3) code is used as the error-correcting code.

Although omitted in the description of FIGS. 7A to 7C, a gap area corresponding to 6 symbols and a sink area corresponding to 2 symbols are actually added in the data block transferred using the time slots 1 through 6 in addition to a data area corresponding to 240 symbols as shown in FIG. 9. A sink for detecting the data block is placed in the sink area. Incidentally, the sink area is always QPSK-modulated regardless of a data area modulation scheme.

Figure 12:
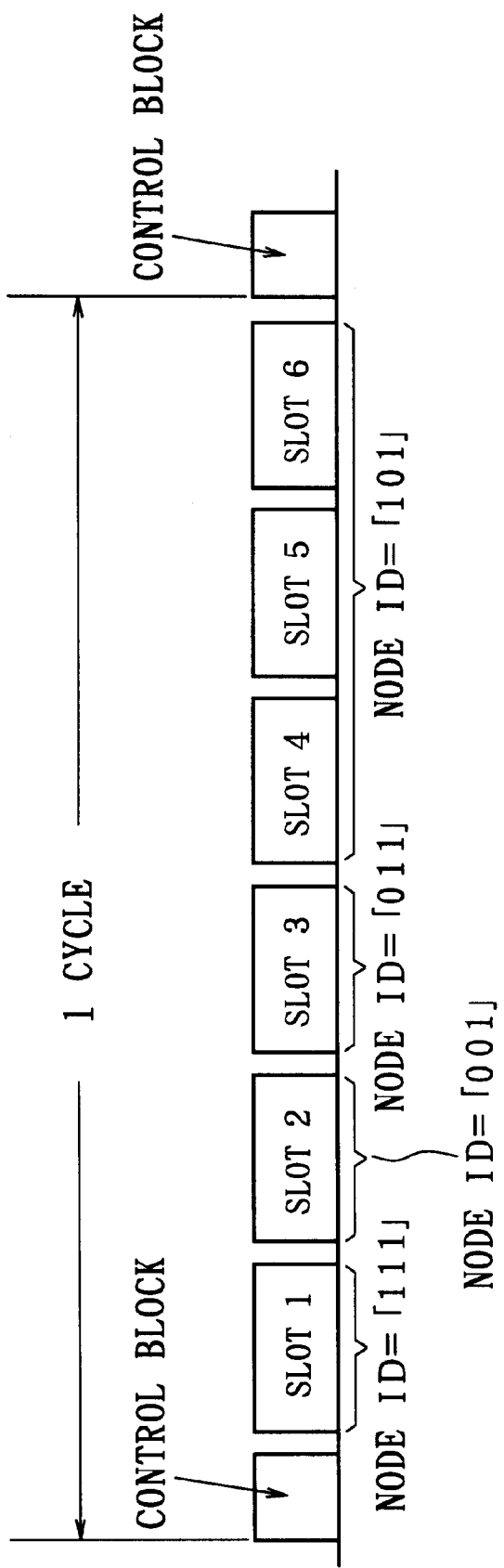
FIG. 12 is a diagram illustrating an example of an assignment of time slots.

While the WN nodes capable of sending are specified or designated by the respective time slots 1 through 6 in the slot permission area of the control block as described above, the designation in this case is related to the subsequent cycles, e.g., the following cycle. FIG. 12 shows an example of assignment of time slots 1 through 6. In the present example, the sending or outgoing of a WN node (control node) having a radio communication ID=[111] is permitted during the time slot 1. The sending of a WN node having a radio communication ID=[001] is permitted during the time slot 2. During the time slot 3, the sending of a WN node having a radio communication ID=[011] is permitted. Further, the sending of a WN node having a radio communication ID=[101] is permitted during the time slots 4 through 6.

A control node can control the outgoing or sending of each individual WN nodes (control node and controlled node) by using the slot permission area of the control block. In this case, the control node is capable of determining nodes whose outgoing are permitted by the respective time slots 1 through 6, according to data transfer information of the respective WN nodes, such as a transfer width reserved by the controlled node, the state of data to be transferred, reported by the controlled node. A report about the reservation of the width of the transfer of data from the controlled node to the control node, the state of the data to be transferred, etc. is performed using the above-described access-layer-command, for example.

Thus, the control node can assign a time slot to a predetermined WN node so as to give permission about the sending of the reserved transfer width thereto and is capable of assigning other time slots to another WN node. Further, the control node is capable of easily managing the reservable maximum transfer width by the number of time slots to allow the transfer of ones other than the reserved transfer width. For example, data whose transfer width is not reserved and having no periodicity as in an asynchronous packet can be transferred by using time slots corresponding to a transfer width non-reserved upon transfer of an isochronous packet.

When the time slots for the non-reserved transfer width are used, the controlled node reports the situation of data to be transferred to its corresponding control node by using the above-described access-layer-command, for example. The control node calculates the distribution of the time slots corresponding to the non-reserved transfer width by using various information such as a transfer width of transfer-scheduled data obtained from the controlled node, the type of a packet therefrom, the priority of the contents, the maximum allowable transfer time, thereby to determine a sending-approved node and the type of packet. It is thus possible to avoid the occurrence of a phenomenon, for example, that data is easy to remain or stay at WN nodes having lots of transfer-scheduled data, or that the transfer of data at which a transfer rate is desired, is delayed.

With respect to the data transfer using the time slots as described above, transfer processing can be changed every time slot. For example, an isochronous transfer assures the width of transfer of data and the time required transferring it, whereas an asynchronous transfer needs to ensure the transfer contents rather than the transfer time. Accordingly, transfer processes such as a process for preferentially offering an available transfer width in regard to a transfer in which priority is given to the transfer time, a process for permitting retransfer processing upon the occurrence of an error in regard to a transfer for giving priority to the assurance of the contents, can be easily implemented in time slot units by performing transfers different in priority on these wireless networks in separate time slots.

Figure 2:
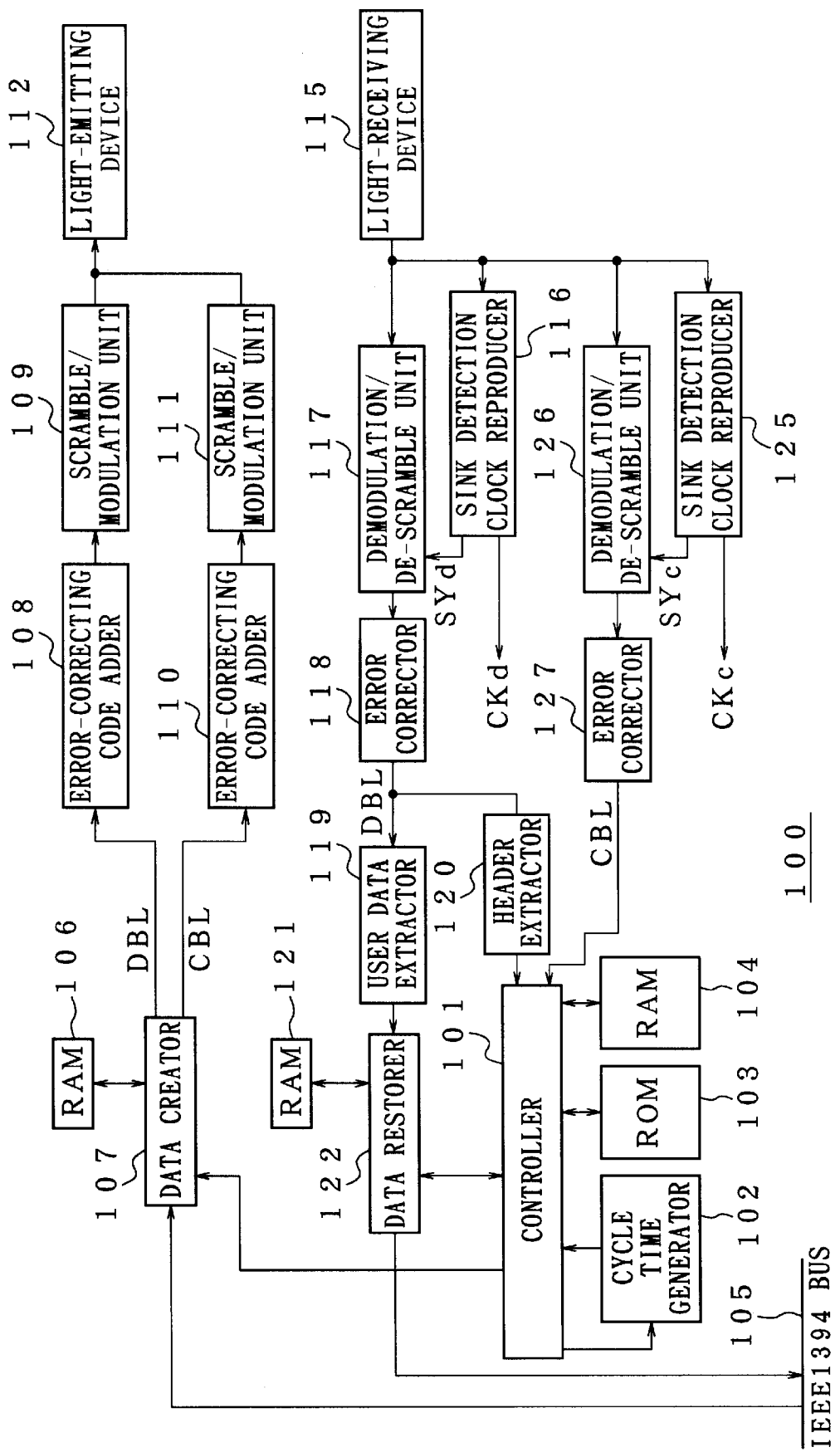
FIG. 2 is a block diagram illustrating a configuration of a node for the wireless network.

A configuration of a WN node 100 (corresponding to each of the WN nodes 2 through 6) will next be described. FIG. 2 shows the configuration of the WN node 100 used as a control node or a node to be controlled. The WN node 100 has a controller 101, which is provided with a microcomputer, for controlling the operation of the entire system. A cycle time data generator 102 for generating 32-bit cycle time data (see FIG. 11), a ROM (read only memory) 103 in which operating programs and the like for the microcomputer provided within the controller 101 are stored, and a RAM (random access memory) 104 used as a working memory, are connected to the controller 101.

The cycle time data generator 102 is constructed so as to count up a clock signal of 24.576 MHz. When the WN node 100 serves as the control node, the twelve lowermost bits of the 32-bit cycle time data generated from the cycle time data generator 102 are inserted into a cycle sink area of a control block and supplied to the controlled node. On the other hand, when the WN node 100 serves as the controlled node, the cycle time data generated by the cycle time data generator 102 are updated based on the 12-bit data extracted from the cycle sink area of the received control block.

Further, the WN node 100 has a RAM 106 for temporarily storing packet data such as an isochronous packet, an asynchronous packet, sent from other IEEE1394 nodes (not shown) connected to an IEEE1394 bus 105, and a data creator 107 for utilizing the packet data stored in the RAM 106 and creating a data block (corresponding to portions of headers and user data alone, see FIGS. 7A through 7C) DBL under the control of the controller 101.

When the WN node 100 serves as the control node, the data creator 107 also creates a control block (corresponding to portions of a cycle sink area and a slot permission area alone, see FIG. 9) CBL sent or transmitted at the head of each cycle of 125 μsec. Further, the data creator 107 also creates an access-layer-command used for command communications dedicated between mutual access-layers to perform communications of set information between the control node and the controlled node. The access-layer-command is placed within the user data of the data block as described above and transferred.

Moreover, the WN node 100 has an error-correcting code adder 108 for adding error-correcting parity (ECC) to the data block DBL outputted from the data creator 107, and a scramble/modulation unit 109 for effecting a scramble process and a modulating process on data outputted from the error-correcting code adder 108 and thereafter adding a sink to the head.

The WN node 100 includes an error-correcting code adder 110 for adding an error-correcting code to the control block CBL outputted from the data creator 107, a scramble/modulation unit 111 for effecting a scramble process and a modulating process on data outputted from the error-correcting code adder 110 and thereafter adding a sink to the head, and a light-emitting device (light-emitting diode) 112 for outputting an infrared-ray signal corresponding to each of modulated signals outputted from the scramble/modulation units 109 and 111. Since the control block CBL is not created by the data creator 107 when the WN node 100 is now given as the controlled node, the error-correcting code adder 110 and the scramble/modulation unit 111 are not used.

The WN node 100 has a light-receiving device (photo diode) 115 for receiving the infrared-ray signal, and a sink detection-clock reproducer 116 for pattern-detecting a sink of a data block (see FIG. 9) from a signal outputted from the light-receiving device 115, outputting a detection timing signal SYd and generating a clock signal CKd synchronized with the data block whose sink is detected. The clock signal CKd is used upon processing the data block whose sink has been detected.

The WN node 100 has a demodulation/de-scramble unit 117 for performing a demodulating process and a de-scrambling process on the data block whose sink has been detected, based on the detection timing signal SYd, an error corrector 118 for using parity for the data block outputted from the demodulation/de-scramble unit 117 thereby to error-correct portions of a header and user data, a user data extractor 119 for extracting user data from the data block DBL outputted from the error corrector 118, and a header extractor 120 for extracting a header added to the user data from the data block DBL. The header extracted by the header extractor 120 is supplied to the controller 101.

The WN node 100 includes a RAM 121 for temporarily storing the user data extracted from the user data extractor 119, and a data restorer 122 for restoring the packet data, based on header information while using the user data stored in the RAM 121 and transmitting it to the IEEE1394 node electrically connected to the bus 105. Incidentally, when the user data is an access-layer-command, the command is transmitted to the controller 101 through the data restorer 122.

The WN node 100 includes a sink detection-clock reproducer 125 for pattern-detecting a sink of a control block (see FIG. 9) from the signal outputted from the light-receiving device 115, outputting a detection timing signal SYc and generating a clock signal CKc synchronized with the control block whose sink is detected. Here, the clock signal CKc is used upon processing the control block whose sink has been detected, and is used as a transfer clock signal for sending or outgoing processing.

The WN node 100 has a demodulation/descramble unit 126 for performing a demodulating process and a de-scrambling process on the control block whose sink has been detected, based on the detection timing signal SYc, and an error corrector 127 for using an error-correcting code for data outputted from the demodulation/de-scramble unit 126 thereby to error-correct the control block (corresponding to a cycle sink area and a slot permission area) CBL and supplying it to the controller 101.

When the WN node 100 serves as the control node, the demodulation/de-scramble unit 126 and the error corrector 127 are not used. On the other hand, when the WN node 100 is the control node, the sink detection-clock reproducer 125 does not perform a synchronous process by reference to the clock signal reproduced from the control block and simply serves as a unit for generating a freerunning transfer clock signal.

The operation of the WN node (wireless network node) 100 shown in FIG. 2 will next be described.

A description will first be made of a case where the WN node 100 is of a control node. An outgoing or sending operation thereof is performed as follows:

Under the control of the controller 101, the data creator 107 creates a control block CBL (see FIG. 9) at the head of each cycle of 125 µsec. Thereafter, the error-correcting code adder 110 adds an error-correcting code to the control block CBL. Further, the scramble/modulation unit 111 effects a scramble process and a modulating process on the control block CBL and thereafter adds a sink thereto, thereby forming an outgoing or sending signal for the control block. The light-emitting device 112 is driven by the signal, so that the control block is outputted from the light-emitting device 112 as an infrared-ray signal.

When packet data such as an isochronous packet, an asynchronous packet is transmitted from the IEEE1394 node to the data creator 107 through the bus 105, the packet data is temporarily stored in the RAM 106. Under the control of the controller 101, the data creator 107 creates each data block DBL (see FIGS. 7A through 7C) from the packet data stored in the RAM 106.

The data creator 107 outputs a respective one data block DBL with timing of each time slot at which its own outgoing or sending is allowed. The error-correcting code adder 108 adds an error-correcting code to the data block DBL. Further, the scramble/modulation unit 109 performs a scramble process and a modulating process on the data block and thereafter adds a sink thereto, thereby forming a sending signal for the data block. The light-emitting device 112 is driven by the signal, whereby the data block is outputted from the light-emitting device 112 as an infrared-ray signal.

A receiving operation of the WN node is performed as follows. The light-receiving device 115 receives the infrared-ray signal for the data block. A signal outputted from the light-detecting device 115 is supplied to the sink detection-clock reproducer 116 where the sink of the data block is detected, whereby a detection timing signal SYd is obtained and a clock signal CKd synchronized with the data block whose sink has been detected, is generated.

Further, the output signal of the light-detecting device 115 is supplied to the demodulation/de-scramble unit 117 where a demodulating process and a de-scramble process are effected on the signal, based on the detecting timing signal SYd. Further, the data outputted from the demodulation/de-scramble unit 117 is supplied to the error corrector 118 where the data block DBL is error-corrected using an error-correcting code.

The data block DBL outputted from the error corrector 118 is supplied to the header extractor 120 where the corresponding header is extracted, followed by supplying said header to the controller 101. Similarly, the data block DBL outputted from the error corrector 118 is supplied to the user data extractor 119 from which the user data thereof is supplied to the data restorer 122. The data restorer reconstructs packet data from the extracted user data under the control of the controller 101 based on information about the header. The reconstructed packet data is sent to the IEEE1394 node through the bus 105.

A description will be further made of a case where the WN node 100 is a controlled node. Its sending operation is carried out as follows.

When packet data such as an isochronous packet, an asynchronous packet is transmitted from the IEEE1394 node to the data creator 107 through the bus 105, the packet data is temporarily stored in the RAM 106. Under the control of the controller 101, the data creator 107 creates each data block DBL (see FIGS. 7A through 7C) from the packet data stored in the RAM 106.

The data creator 107 outputs a respective one data block DBL with timing of each time slot at which its own outgoing or sending is allowed. The error-correcting code adder 108 adds an error-correcting code to the data block DBL. Further, the scramble/modulation unit 109 performs a scramble process and a modulating process on the data block and there after adds a sink thereto, thereby forming a sending signal for the data block. The light-emitting device 112 is driven by the signal, whereby the data block is outputted from the light-emitting device 112 as an infrared-ray signal.

A receiving operation of the WN node is performed as follows. The light-detecting device 115 receives infrared-ray signals for a control block and a data block. A signal outputted from the light-detecting device 115 is supplied to the sink detection-clock reproducer 125 where the sink of the control block is detected, whereby a detection timing signal SYc is obtained and a clock signal CKc synchronized with the control block whose sink has been detected, is generated. As described above, the clock signal CKc is used to process the control block and used as a transfer clock signal. That is, the outgoing or sending operation referred to above is executed in synchronism with the transfer clock signal.

Further, the output signal of the light-detecting device 115 is supplied to the demodulation/de-scramble unit 126 where a demodulating process and a de-scramble process are effected on the signal, based on the detecting timing signal SYc. Further, the data outputted from the demodulation/de-scramble unit 126 is supplied to the error corrector 127 where the control block CBL is error-corrected using an error-correcting code.

The control block CBL outputted from the error corrector 127 is supplied to the controller 101. The controller 101 extracts 12-bit data contained in a cycle sink area of the control block CBL and updates cycle time data generated from the cycle time data generator 102, based on the 12-bit data. Thus, relative time intervals of all the nodes are automatically synchronized at the heads of the respective cycles. Further, the controller 101 can recognize each time slot at which its own outgoing or sending is allowed, from information in the slot permission area of the control block CBL.

Further, the output signal of the light-receiving device 115 is supplied to the sink detection-clock reproducer 116 where the sink of the data block is detected, whereby a detection timing signal SYd is obtained and a clock signal CKd synchronized with the data block whose sink has been detected, is generated.

The output signal of the light-receiving device 115 is supplied to the demodulation/de-scramble unit 117 where a demodulating process and a de-scrambling process are effected on the signal, based on the detection timing signal SYd. Further, the data outputted from the demodulation/de-scramble unit 117 is supplied to the error corrector 118 where the data block DBL is error-corrected by using an error-correcting code.

The data block DBL outputted from the error corrector 118 is supplied to the header extractor 120 where the corresponding header is extracted, followed by supplying said header to the controller 101. Similarly, the data block DBL outputted from the error corrector 118 is supplied to the user data extractor 119 from which the user data thereof is supplied to the data restorer 122. The data restorer reconstructs packet data from the extracted user data under the control of the controller 101 based on information about the header. The reconstructed packet data is sent to the IEEE1394 node through the bus 105.

A description will next be made of an operation example at the time that packet data compliant with the IEEE1394

Standard is transferred from a first WN node to a second WN node, by using FIGS. 13A through 13E.

Figure 13:
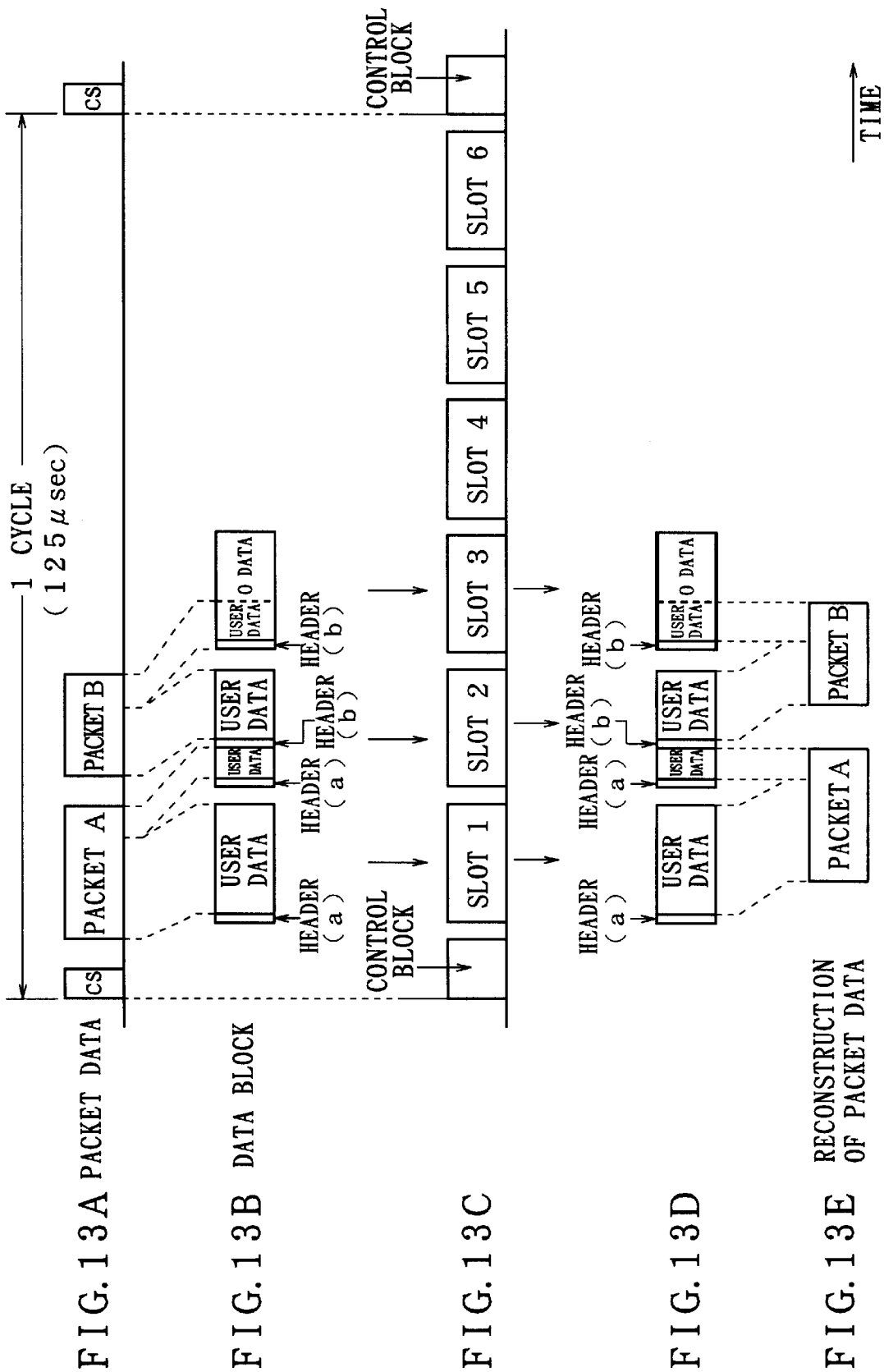
FIGS. 13A through 13E are respectively diagrams for describing data block converting and packet reconfiguring operations.

Now consider where after a cycle-start-packet (CS) has been transmitted from an IEEE1394 node to a data creator 107 of the first WN node as shown in FIG. 13A, a packet A and a packet B are transmitted as packet data. Incidentally, the cycle-start-packet is transmitted once per 125 μsec from a cycle-master. However, it is not necessarily transmitted at 125 μsec time interval. The time interval might be greater than 125 μsec according to the size of the packet data.

The data creator 107 creates fixed-length, data blocks from these packets A and B as shown in FIG. 13B. In this case, for example, a data block having only data in the packet A, a data block having data in the packets A and B, a data block having only data in the packet B and in which 0 data is placed in a space area, etc. are created according to data lengths of the packets A and B. In this case, headers respectively having information about the original packets, divided information, etc. are provided at the heads of data (user data) constituting the respective packets.

Thus, the corresponding data block created by the data creator 107 of the first WN node is sent to the second WN node through the use of time slots 1 through 3 at which outgoing or sending thereof is allowed by a WN node used as a control node as shown in FIG. 13C. In this case, error-correcting parity is added to each data block and subjected to a scramble process and a modulating process, after which a sink is added to each data block, which in turn is transmitted as an infrared-ray signal.

As shown in FIG. 13D, the second WN node receives each data block sent from the first WN node. User data extracted from the data block is supplied to a data restorer 122. Further, the header extracted from the data block is supplied to a controller 101. The data restorer 122 reconstructs the original packet data from the user data as shown in FIG. 13E, based on the information about the original packets, the divided information, etc. contained in the headers. The packet data is transmitted to the IEEE1394 node.

A description will next be made of how to enter and remove nodes from the wireless network shown in FIG. 1 and how to allocate radio communication ID and node ID (only bus ID) to the respective WN nodes in the wireless network.

Figures 14, 16:
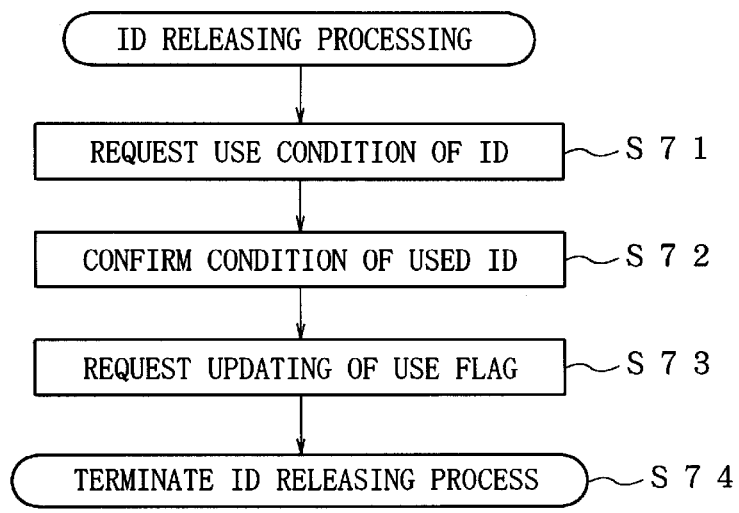
FIG. 14 is a diagram showing the contents stored in storage areas about radio communication ID and bus ID.
FIG. 16 is a flowchart for describing a control operation for an ID deallocating process.

In the present embodiment, a wireless network having seven WN nodes at maximum can be constructed. Radio communication ID comprises 3-bit data. As described above, [111] is defined as a radio communication ID for each control node, [000] is defined as a radio communication ID for the purpose of temporary utilization, and a radio communication ID for each controlled node is defined as any of [001] through [110]. The allocation of the radio communication ID to the controlled nodes is collectively managed by the control node. Therefore, the RAM 104 of the WN node 100 (see FIG. 2) capable of serving as the control node is provided with a first storage area for storing therein a use flag indicative of the condition, of the usage of radio communication ID, and a second storage area for storing therein information about the frequency of outgoing or sending of the WN node having the radio communication ID as shown in FIG. 14. A radio communication ID at which the use flag is [1], indicates that it is in use, and a radio communication ID at which the use flag is [0], indicates its non-use. Further, the frequent information is set as 2-bit data. [11] indicates high frequency, [10] indicates normal frequency, and [00] indicates low frequency, respectively. Incidentally, the frequency with respect to each non-used radio communication ID is set to [00].

The WN node 100 capable of serving as the control node has a function to reserve and hold the seven bus IDs, A to G, corresponding to the radio communication IDs, [000] through [111], as shown in FIG. 14. In this case, the bus ID of the control node of which the radio communication ID is [111] is G. The reservation and hold of the bus ID is illustratively executed when the WN node 100 becomes the control node. As will be described later, when a controlled node is newly entered into the network, the radio communication ID and the bus ID corresponding to the radio communication ID are allocated to the controlled node. Further, when the controlled node is removed from the network, the radio communication ID allocated to the controlled node and the bus ID corresponding to the radio communication ID are deallocated.

Figure 15:
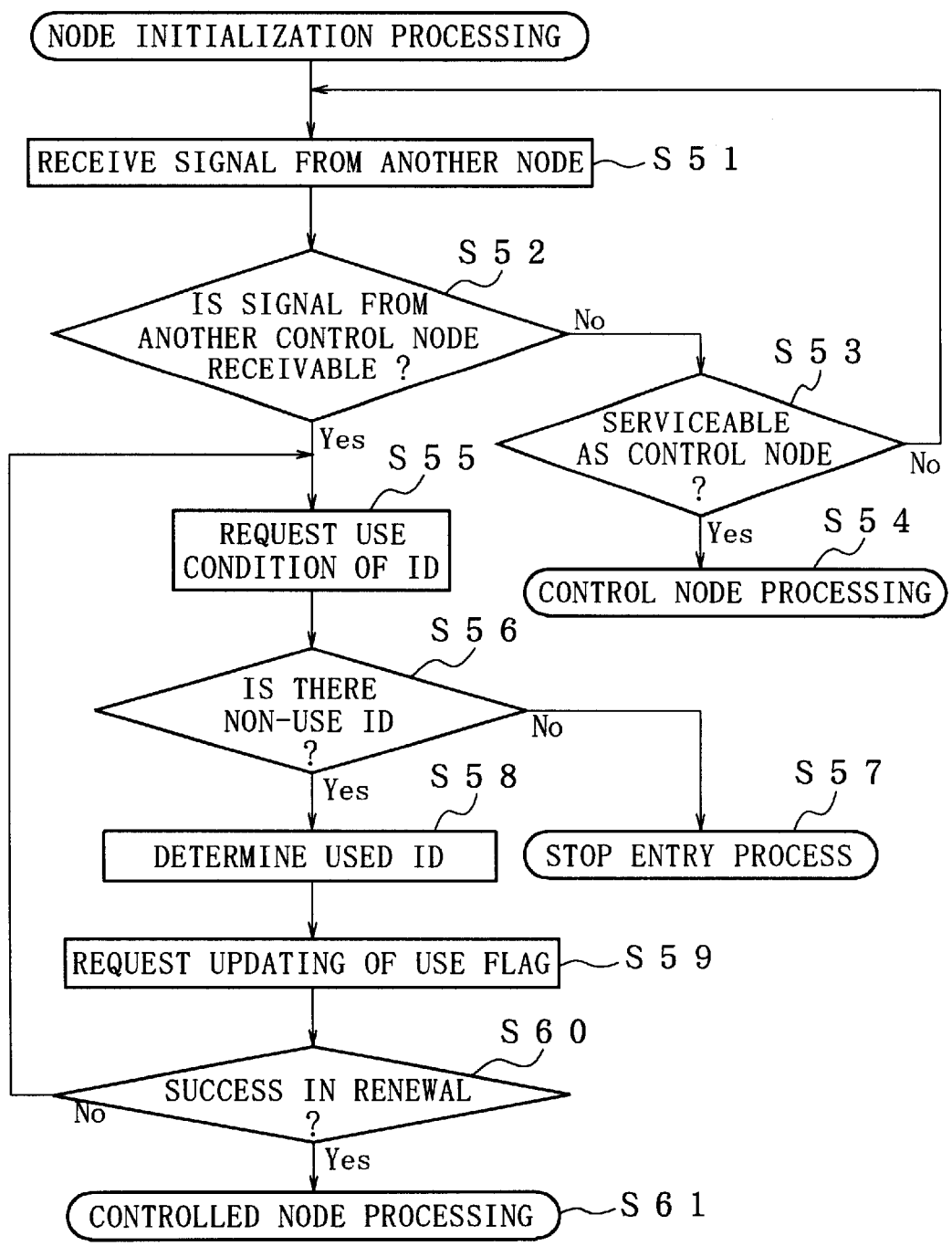
FIG. 15 is a flowchart for describing a control operation for a node initializing process.

A node initializing process will next be explained using a flowchart shown in FIG. 15. A control program for the node initializing process is started up with power-on, for example.

When the node initializing process is started up, the WN node 100 starts to receive a signal from another WN node in Step S51. It is determined in Step S52 whether it can receive a control block from a WN node 100 used as a control node.

When it is found that the control block cannot be received, this means that the wireless network is not yet constructed. Therefore, the WN node determines in Step S53 whether it itself is able to serve as the control node. Here, the WN node 100 capable of serving as the control node, is provided with the first storage area for storing therein the use flag indicative of the condition of the usage of radio communication ID, and the second storage area for storing therein the information about the frequency of outgoing or sending of the WN node having the radio communication ID as well as it has the function to reserve and hold the bus ID corresponding to the radio communication ID, as described above. When the WN node is found to be unable to serve as the control node, the control program is returned to Step S51. On the other hand, when the WN node is found to be able to serve as the control node, it proceeds to Step S54 where it serves as the control node, whereby the WN node is shifted to a control node processing state.

In this case, the WN node 100, which has just taken on the control node, has no controlled nodes which serve as objects for communications in the corresponding wireless network. Therefore, the WN node serving as the control node continues to send the control block at 125 μsec intervals, for example. Owing to the outgoing or sending of the control block, another WN node 100 is prevented from serving as the control node within the corresponding wireless space.

When it is determined in Step S52 that a signal from the WN node 100 used as the control node, e.g., a control block can be received, the WN node proceeds to Step S55 to enter into the corresponding wireless network as the controlled node. In the slot permission area of the control block (see FIG. 9) as described above, the WN node 100 capable of sending with each individual time slots 1 to 6 in the next cycle is designated or specified through the use of the radio communication ID. By using the radio communication ID [000] for the purpose of the temporary utilization, a sending's opportunity is given to a WN node 100 having no radio communication ID.

In Step S55, the WN node 100 makes a request to a control node for transmission of the use condition of the radio communication ID and bus ID by using a time slot designated by the radio communication ID [000]. This request is performed using an access-layer-command. When the request is made, the WN node 100 used as the control node refers to the use flags stored in the first storage area of the RAM 104 and transmits the use condition of these IDs to the requested new node. The transmission of the use condition is also performed using the access·layer·command.

It is next determined based on the use condition of the IDs in Step S56 whether a non-used ID exists. When the non-used ID is absent, the control program proceeds to Step S57 where a process for entering controlled nodes into the wireless network is stopped. It is thus not possible to enter controlled nodes exceeding six into the wireless network.

When the non-used ID is found to exist in Step S56, the control program proceeds to Step S58 where its own used IDs are determined. In Step S59, the WN node requests the WN node 100 used as the control node to update the respective use flags corresponding to the determined IDs from [0] to [1] through the use of the time slot designated by the above-described radio communication ID [000]. This request is performed by using the access·layer·command.

When the request is made, the WN node 100 used as the control node renews the use flag of the ID, whose updating has been requested as described above, among the use flags stored in the first storage area of the RAM 104 from [0] to [1]. When the use flag of the requested ID, whose updating has been requested, is already renewed to [1], there is a high possibility that while the corresponding new node is performing processing, the use flag for the corresponding ID would be updated to [1] by a request issued from another new node, thereby resulting in a failure in renewal. The WN node 100 used as the control node notifies a success or failure in renewal to the new node to which the renewal of the use flag of the corresponding ID is requested. This notification is also performed by the access·layer·command.

It is next determined in Step S60 whether the use flag has succeeded in its renewal. When the renewal is found to have failed, the control program is returned to Step S55 where the WN node requests the control node to transmit the use condition of the ID again in order to enter into the corresponding wireless network as a controlled node. Therefore, the operation similar to above is repeated. On the other hand, when the renewal is found to have succeeded, the WN node is brought to a controlled node specified by the corresponding ID and shift s to a controlled node processing state in Step S61. In this case, the control node allocates the radio communication ID and the bus ID corresponding thereto to the controlled node.

Owing to the above node initializing process, the new node automatically obtains the radio communication ID and the bus ID and enters into the corresponding wireless network, based on the so-obtained ID. As a result thereof, this controlled node can be communicated by radio using allocated radio communication ID, and the bus connected with the controlled node can be designated based on the allocated bus ID.

A description will next be made of a radio communication ID and a bus ID deallocating processes at the time that a WN node 100 used as a controlled node is removed from the corresponding wireless network, with reference to a flowchart shown in FIG. 16. A control program for these ID deallocating processes is started up with power-off, for example.

When these ID deallocating processes are started, the WN node 100 makes a request to a control node for the transmission of the use condition of the radio communication ID and the bus ID through the use of a time slot designated by its own radio communication ID in Step S71. When the request is made, the WN node used as the control node refers to the use flags corresponding to the IDs stored in the first storage area of the RAM 104 and transmits the use condition of these IDs to the requested node.

Next, in Step S72, the WN node confirms that its own IDs are in use, according to the use condition of these IDs. In Step S73, the WN node requests the WN node 100 used as the control node to update the respective use flags corresponding to its own IDs from [1] to [0] through the use of the time slot specified by its own radio communication ID. In Step S74, the ID deallocating process terminates.

When the above request is made, the WN node 100 used as the control node rewrites the renewal-requested use flag corresponding to the requested ID as described above, among the use flags stored in the first storage area of the RAM 104, from [1] to [0]. Therefore, the control node deallocates the ID allocated to the controlled node.

Owing to the above-described ID deallocating process, each controlled node having the radio communication ID and bus ID automatically deallocates its IDs and is hence removed from the corresponding wireless network.

As described above, the control program (see FIG. 15) for the node initializing process is started up when the WN node 100 is powered-on. On the other hand, the control program (see FIG. 16) for the ID deallocating process is started up when the WN node 100 is powered-off. Therefore, the corresponding wireless network continues to exist unless the power of the control node is turned off. Other nodes obtain their radio communication ID and bus ID with power-on and can enter into the corresponding wireless network as controlled nodes. With power-off in reverse, the nodes deallocate their radio communication ID and bus ID, so that they can be removed from the corresponding wireless network.

Meanwhile, communications between a control node and a controlled node are considered to lose contact with each other when a WN node 100 constructing a wireless network is moved outward from the network and a signal is cut off or screened even when it is placed within the network. Even in such a case, the network cannot be operated with efficiency even though the control node gives permission of sending to the corresponding controlled node in a manner similar to other controlled nodes. Therefore, the WN node 100 used as the control node executes a process for adjusting or controlling the frequency of sending permission.

Figure 17:
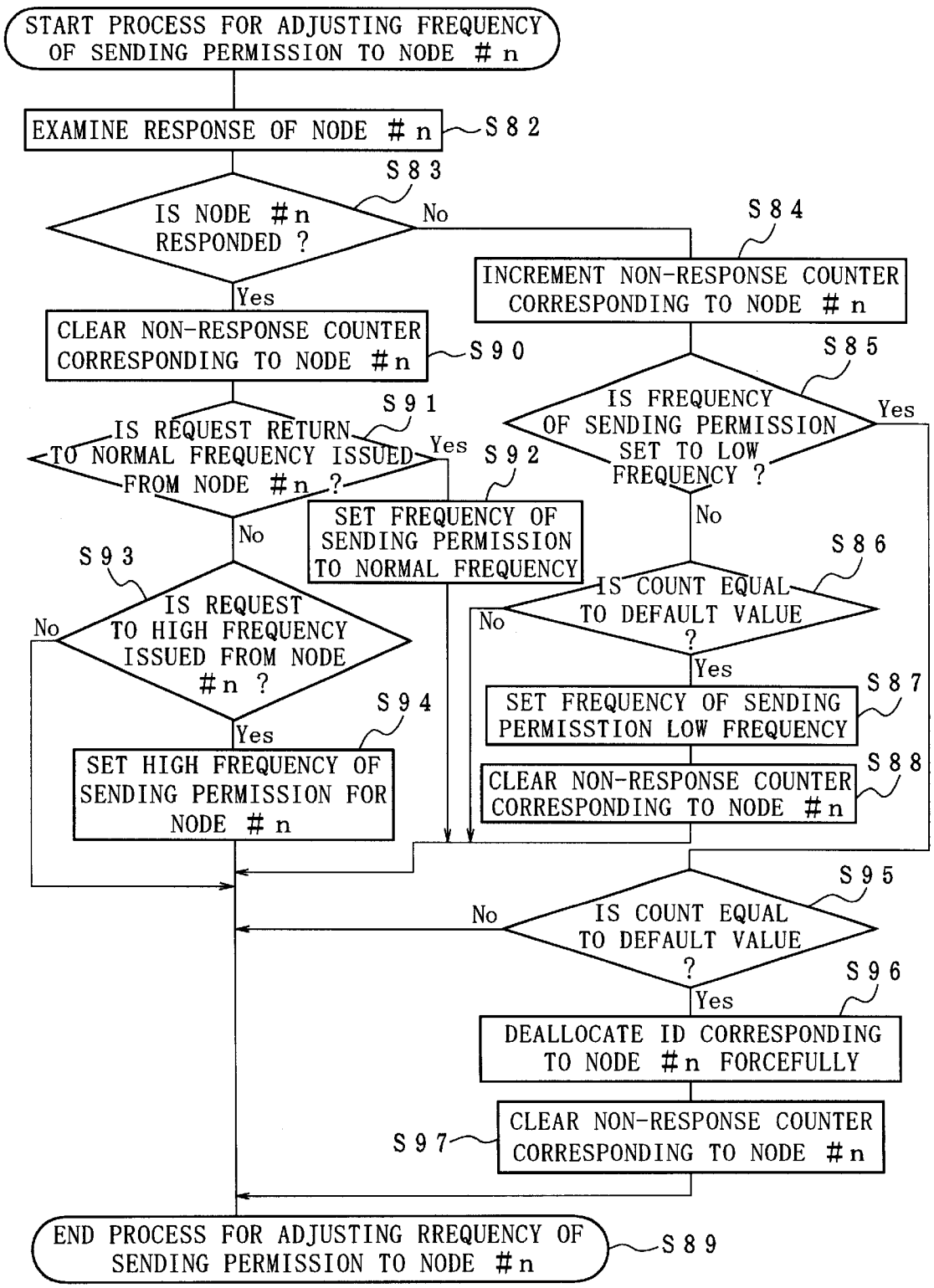
FIG. 17 is a flowchart for describing a control operation for a process for adjusting the frequency of sending permission.

A description will be made of a process for adjusting the frequency of sending permission to a node #n by using a flowchart shown in FIG. 17. A control program for the adjusting process is started up each time the permission of sending or outgoing is given to the node #n.

First, the reaction or response of the node #n is examined in Step S82. It is determined in Step S83 whether the node #n has reacted or responded. When the node #n sends a signal in a time slot at which its sending is permitted, it is determined that the node #n has reacted.

When the node #n is found not to react in Step S83, the control program proceeds to Step S84 where a count of a non-reaction or non-response counter corresponding to the node #n is incremented. In Step S85, a decision is made as to whether the frequency of sending permission to the node #n is set to low frequency. In other words, it is determined whether frequency information corresponding to the node #n stored in the second storage area (see FIG. 14) of the RAM 104 is given as [00]. When the frequency of sending permission to the node #n is found not to be low frequency, the control program proceeds to Step S86 where it is determined whether the count of the non-reaction counter is a default value, i.e., the number of non-reactions reaches a predetermined number of times.

When the count is found not to be the default, the control program proceeds to Step S89 where the process for controlling the frequency of sending permission to the node #n terminates. On the other hand, when the count is found to be the default, the control program proceeds to Step S87 where the frequency information of the node #n stored in the second storage area of the RAM 104 is renewed to [00] and the frequency of sending permission to the node # is set to the low frequency. Further, the count of the non-reaction counter of the node #n is cleared to 0 in Step S88. Thereafter, the control program proceeds to Step S89 where the process for controlling the frequency of sending permission to the node #n is completed. Owing to the setting of the sending frequency for the node #n to the low frequency as described above, the frequency of sending permission to the node #n becomes low as will be described later and the opportunities of sending permission to other nodes are enlarged, thereby allowing efficient operation of the wireless network.

When the frequency of sending is found to be set to the low frequency in Step S85, the control program proceeds to Step S95 where it is determined whether the count of the non-reaction counter is a default value. When the count is found not to be the default value, the control program proceeds to Step S89 where the process for adjusting the frequency of sending permission to the node #n is terminated. On the other hand, when the count is found to be the default value, the control program proceeds to Step S96 where a radio communication ID and a bus ID corresponding to the node #n is forcefully deallocated. That is, a use flag corresponding to these IDs, which has been stored in the first storage area of the RAM 104, are renewed from [1] to [0] (see FIG. 14). In Step S97, the count of the non-reaction counter of the node #n is cleared to 0 and thereafter the control program proceeds to Step S89 where the process for adjusting the frequency of sending permission to the node #n terminates.

The forceful releasing of these IDs as described above makes it possible to eliminate waste of those IDs and the transfer width that continues to be offered to each node expected to be already unusable. The corresponding node #n whose IDs have been forcefully deallocated, automatically detects that its own IDs are forcefully deallocated owing to the absence of the sending permission altered from the lowered state of the frequency of sending permission. The corresponding node #n immediately loses those IDs and hence needs the node initializing process (see FIG. 15) to enter into the wireless network.

When it is determined in Step S83 that the node #n has reacted, the control program proceeds to Step S90 where the count of the non-reaction counter of the node #n is cleared to 0. It is determined in Step S91 whether a request for a return to the normal frequency is made from the node #n. This return request is transmitted by the above-described access·layer·command. When the request for the return to the normal frequency is given, the control program proceeds to Step S92 where the frequency of sending permission is set to the normal frequency. In other words, the frequency information about the node #n stored in the second storage area of the RAM 104 is renewed from [00] to [10]. Thereafter, the control program proceeds to Step S89 where the process for controlling the frequency of sending permission to the node #n terminates.

When the request for the return to the normal frequency is found not to be issued from the node #n in Step S91, the control program proceeds to Step S93 where it is determined whether a request to high frequency is issued from the node #n. This request is also transmitted through the use of the above-described access·layer·command. When the request to the high frequency is not made, the control program proceeds to Step S89 where the process for adjusting the frequency of sending permission to the node #n is finished. On the other hand, when the request to the high frequency is made, the control program proceeds to Step S94 where the frequency of sending permission is set to the high frequency. In other words, the frequency information about the node #n stored in the second storage area of the RAM 104 is renewed to [11]. Thereafter, the control program proceeds to Step S89 where the process for controlling the frequency of sending permission to the node #n terminates.

The above-described process for adjusting the frequency of sending permission is performed every time the permission of sending or outgoing is given to each node. Thus, the network can be operated with efficiency.

Incidentally, as described above, the control node prepares a radio communication ID for the purpose of temporary utilization to give a sending opportunity to a node with no radio communication ID. The control node can provide the permission of sending by the radio communication ID for the purpose of temporary utilization in a cycle for the corresponding node set to the low frequency, for example. Alternatively, the control node can provide the permission of sending by the radio communication ID for the purpose of temporary utilization by utilizing that there is no data to be sent to other nodes and allowance is made for a data transfer width. This is because a node desiring to enter into the corresponding wireless network does not necessarily exist within the network at all times.

Figure 18:
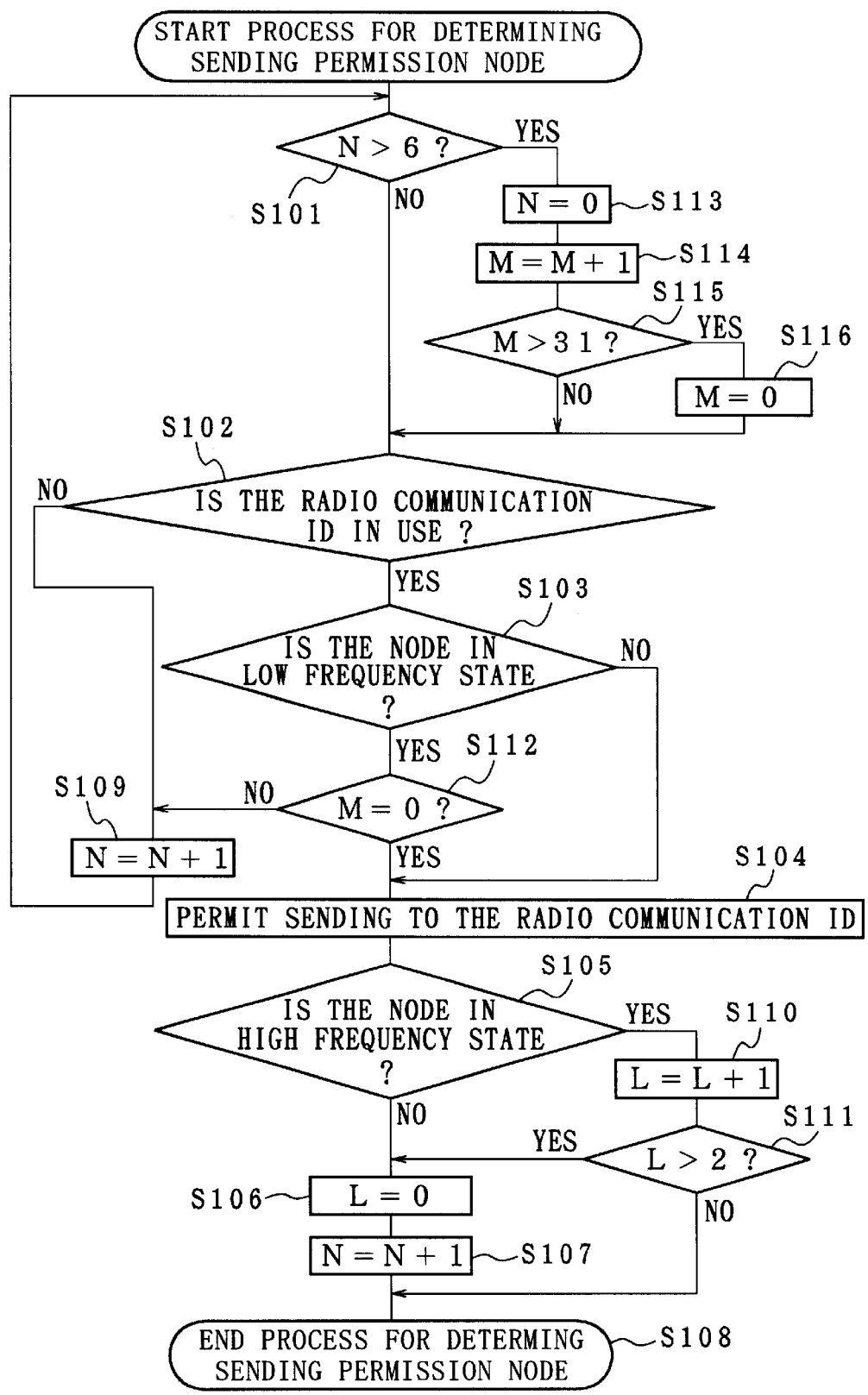
FIG. 18 is a flowchart for describing a control operation for a sending permission node determining process.

The sending permission to the respective WN nodes 100 is limited according to the frequency of sending permission to the respective nodes adjusted by the above-described process (see FIG. 17) for adjusting the frequency of sending permission. FIG. 18 shows one example of a control operation of WN node 100 used as a control node, for determining a node which permits sending in a given time slot.

The example shown in FIG. 18 illustrates a case in which a wireless network is constructed by seven WN nodes 100 at maximum inclusive of a control node. When, in this case, the frequency of sending permission to a certain WN node 100 is set to normal frequency, a decision as to sending permission with respect to one time slot is made to the WN node 100 within one cycle used for a sending permission process. Here, a process for determining whether the sending permission should be given to all the WN nodes 100 in order is performed during one cycle for the sending permission process.

On the other hand, when the frequency of sending permission to the certain WN node 100 is set to high frequency, a decision as to sending permission with respect to three continuous time slots is made to the WN node 100 within one cycle for the sending permission process. Further, when the frequency of sending permission to the certain WN node 100 is set to low frequency, a decision as to sending permission with respect to one time slot is made to the WN node 100 within 32 cycles for the sending permission process.

It is first determined in Step S101 whether a count N of an ID counter is greater than 6. In this case, 0 through 6 each represented as the count N correspond to [00] through [111] of nodes ID, respectively. When the count N is found not to be N>6, this means that the control operation is in course of one cycle for the sending permission process, and the operation goes to Step S102 where a decision is made as to whether a radio communication ID corresponding to the count N is in use. When the radio communication ID is found to be not in use, the operation goes to Step 109 where the count N of the ID counter is incremented, followed by return, to Step S101. On the other hand, when the radio communication ID is found to be in use, it is determined in Step S103 whether the frequency of sending permission to a WN node having the radio communication ID is set to low frequency.

When the frequency of sending permission is not set to the low frequency, the operation goes to Step S104. On the other hand, when the frequency of sending permission is set to the low frequency, the operation goes to Step 5112 where it is determined whether a count M of a low-frequency counter is 0. If the count M is found not to be M=0, the operation goes to Step 109 where the count N of the ID counter is incremented, followed by return to Step S101. On the other hand, when M=0, the operation goes to Step S104. In Step S104, the permission of sending by a radio communication ID corresponding to the count N of the ID counter is decided so as to be made to one time slot for the corresponding process.

It is determined in Step S105 whether the frequency of sending permission to a WN node 100 having the radio communication ID is set to high frequency. When the answer is found not to be high frequency, the operation goes to Step S106 where a count L of a high-frequency counter is set to 0. In Step S107, the count of the ID counter is incremented. Thereafter, the operation goes to Step S108 where the process for determining each sending-permitted node with respect to one time slot terminates.

On the other hand, when it is determined in Step S105 that the frequency of sending permission is set to the high frequency, the operation goes to Step S110 where the count L of the high-frequency counter is incremented, followed by proceeding to Step S111. It is determined in Step S110 whether the count L is greater than 2. If the count L is found not to be L>2, then the operation goes to Step 108 where the process for determining the sending-permitted node terminates. the other hand, when L>2, the operation goes to Step S106 where the count L of the high-frequency counter is set to 0. In Step S107, the count of the ID counter is incremented. Thereafter, the operation goes to Step S108 where the process for deciding the sending-permitted node with respect to one time slot terminates.

When N>6 in Step S101, this means that one cycle for the sending permission process has been finished. Therefore, the operation goes to Step S113 where the count N of the ID counter is set to 0. In Step S114, the count M of the low-frequency counter is incremented. It is determined in Step S115 whether the count M is greater than 31. If the count M is found not to be M>31, this means that the operation is in course of 32 cycles for the sending permission process, and the operation goes to Step S102 where operation similar to the above operation is performed. On the other hand, when M>31, this means that the above 32 cycles have been finished, and the count M is set to 0. Thereafter, the operation goes to Steps S102.

When the WN node 100 having the radio communication ID corresponding to the count N of the ID counter is in use and the frequency of its sending permission is set to the normal frequency upon the control operation shown in FIG. 18, the control operation routine goes from Step S102 to Step S104 through Step S103, where the permission of sending by the above-described radio communication ID is decided so as to be made to one time slot for the corresponding process. Further, the operation goes to Step S107 through Step S106, where the count N is incremented and thereafter the corresponding process terminates. Thus, a decision as to the sending permission is inevitably made to the WN node 100 whose frequency of sending permission is set to the normal frequency upon the control operation shown in FIG. 18. Accordingly, the decision as to the sending permission with respect to one time slot is made to the WN node 100 within one cycle for the sending permission process.

Next, when the WN node 100 having the radio communication ID corresponding to the count N of the ID counter is in use and the frequency of its sending permission is set to the high frequency, the operation goes from Step S102 to Step S104 through Step S103, where the permission of sending by the above-described radio communication ID is decided so as to be made to one time slot for the corresponding process. In Step S110, the count L of the high-frequency counter is incremented. When the count L is not greater than 2, the count N of the ID counter is not incremented and the corresponding process terminates.

Therefore, the operation shown in FIG. 18 is continuously performed three times with respect to the WN node 100 whose frequency of sending permission is set to the high frequency, with the radio communication ID of the corresponding WN node 100 as an object, thereby to make a decision as to the sending permission to three continuous time slots. Accordingly, the decision as to the sending permission with respect to the three continuous time slots is made to the WN node 100 within one cycle for the sending permission process.

Next, when the WN node 100 having the radio communication ID corresponding to the count N of the ID counter is in use and the frequency of its sending permission is set to the low frequency, the operation goes from Step S102 to Step S112 through Step S103. Only when the count M of the low-frequency counter is 0, the operation goes to Step S104 where the permission of sending by the above-described radio communication ID is decided so as to be made to one time slot for the corresponding process. Further, the operation goes to Step S107 through Step S106, where the count N is incremented and the processing terminates.

Since the count M of the low-frequency counter is set to 0 every time 32 cycles for the sending permission process are completed (Steps S115 and S116), a decision as to the sending permission is made to the WN node 100 whose frequency of sending permission is set to the low frequency, only in the first cycle of the 32 cycles for the sending permission process. Thus, when the frequency of sending permission to the WN node 100 is set to the low frequency, a decision as to the sending permission with respect to one time slot is made to the WN node 100 within the 32 cycles for the sending permission process.

In the present embodiments described above, when the controlled node is newly entered into the wireless network, the non-used bus ID is allocated to the controlled node among the bus IDs reserved and held in the control node, and when the controlled node is removed from the wireless network, the bus ID allocated to the controlled node is deallocated by the control node. Thus, the control node may grasp the configuration of the whole network easily when the controlled node is entered into and removed from the wireless network and then, this eliminates the for resetting the whole network.

Incidentally, in the above embodiments, when radio communication ID is allocated to the controlled node entered into the wireless network, the bus ID is simultaneously allocated thereto. However, it is conceivable that the control node allocates the bus ID to the controlled node after it has allocated the radio communication ID to the controlled node. A flowchart shown in FIG. 19 shows the operation of a process for the distribution of bus ID.

Figure 19:
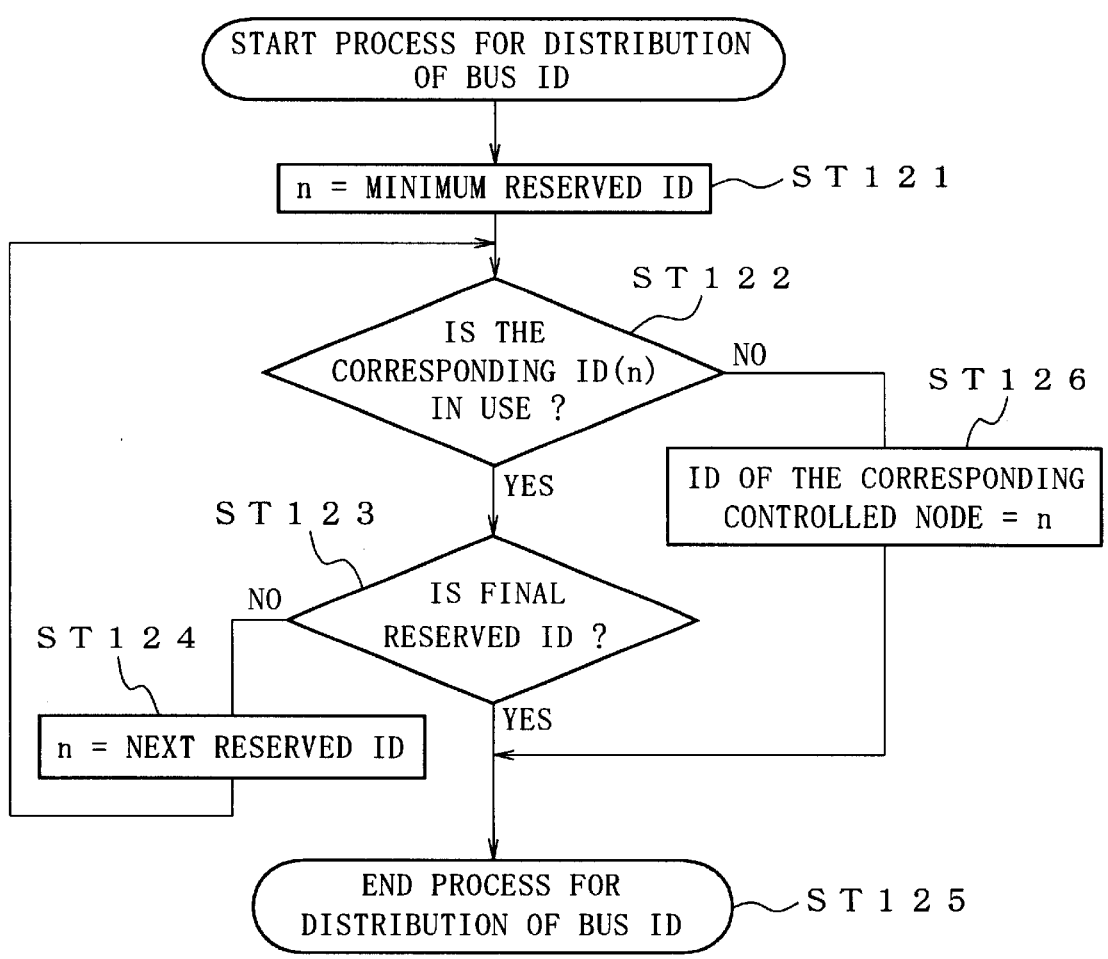
FIG. 19 is a diagram for describing a control operation for a bus ID distribution process.

In this FIG. 19, at first the minimum value of the bus ID reserved and held in the RAM 104 is set to n in Step S121. Next, it is determined, in Step 122, whether or not n set in the Step S121 is used as the bus ID of another node. The use condition of the bus ID may be confirmed illustratively referring to the use flag as shown in FIG. 14. When n is determined as non-used, the operation goes to Step S126 where n is allocated to a controlled node newly entered into the network as their bus ID and, in Step 125, the process for the distribution of bus ID terminates.

On the other hand, when n is determined in Step S122, to be in use as the bus ID of another node, the operation goes to Step S123 where it is determined whether or not said n is the final bus ID among the bus IDs reserved and held in the RAM 104. In other words, it is determined whether all the bus IDs held in the RAM 104 are allocated to other nodes. When it is determined that the n is not the final bus ID, the operation goes to Step S124 where next large bus ID among the bus IDs reserved and held in the RAM 104 is set to n. Thereafter, the processes described in the above steps Step 122 or later are repeated. On the other hand, When it is determined that the n is the final bus ID in Step 125, the process for the distribution of bus ID terminates.

Further, in the above embodiments, when radio communication ID allocated to the controlled node removed from the wireless network is deallocated, the bus ID is simultaneously deallocated therefrom. However, it is conceivable that the control node deallocates the bus ID after it has deallocated the radio communication ID allocated to the controlled node.

Additionally, in the above embodiments, it is described that the reserved and held bus ID is allocated to the controlled node newly entered into the wireless network. However, it is conceivable that the control node reserves and holds a predetermined number of node ID (bus ID and physical layer ID) and, when the controlled node is newly connected with the bus to which the control node is connected, non-used node ID is allocated to the controlled node.

The program data for implementing the process of each of the above flowcharts, which has been described above, can be provided by disk-like recording medium such as various optical disk magnetic disk or tape-like recording medium. Further, it is also able to provide said program using various communication lines. In this case, each node may install and download the program.

According to the invention, the control device (control apparatus) allocates the identifier not yet allocated among the held identifiers, when the controlled apparatus is newly entered into the network, to the controlled apparatus and deallocates the identifier allocated to the controlled apparatus when the controlled apparatus is removed from the network. Thus, the control device may grasp the configuration of the whole network easily when the controlled apparatus is entered into and removed from the network and then, eliminating the need for resetting the whole network.

INDUSTRIAL APPLICABILITY

As described above, the control device, the control method, the radio communication apparatus, and computer-readable medium according to the present invention are suitable for application to the wireless network using radio communication mediums such as infrared rays.

What is claimed is:

1. A control device for controlling a plurality of controlled apparatuses performing communications within a wireless network, comprising:

a first wireless network node included in said control device and a plurality of wireless network nodes each included in a corresponding one of said plurality of controlled apparatuses;

a first data packet sending and receiving means included in said control device and a plurality of data packet sending, and receiving means each included in a corresponding one of said plurality of controlled apparatuses;

a first controller included in said control device and a plurality of controllers each included in a corresponding one of said plurality of controlled apparatuses, wherein when, on power up, a first one of said plurality of controlled apparatuses receives a control block from a second one of said plurality of controlled apparatuses, said second one of said plurality of controlled apparatus functions as said control device and performs a node initialization process to form said wireless network, and when said first one of said plurality of controlled apparatuses cannot receive said control block from said second one of said plurality of controlled apparatuses, said first one of said plurality of controlled apparatuses configures itself to function as said control device and performs said mode initialization process to form said wireless network;

holding means for holding a predetermined number of identifiers to be allocated to any of said plurality of controlled apparatuses connected to said wireless network;

allocating means for allocating an identifier not yet allocated among said identifiers held in said holding means to one of said plurality of controlled apparatuses, when said one of said plurality of controlled apparatuses is newly connected to said wireless network on power-up; and deallocating means for deallocating said identifier allocated to said one of said plurality of controlled apparatuses when said one of said plurality of controlled apparatuses is removed from said wireless network on power-down.

2. The control device according to claim 1, wherein said identifier allocated to said one of said plurality of controlled apparatuses identifies a bus connected to said one of said plurality of controlled apparatuses.

3. The control device according to claim 1, wherein the identifier allocated to said one of said plurality of controlled apparatuses comprises a first identifier for identifying said one of said plurality of controlled apparatuses and a second identifier for identifying a bus connected to said one of said plurality of controlled apparatuses.

4. The control device according to claim 1, wherein said control device further comprises storing means for storing data indicating a use condition of said identifier; and said allocating means alters said data indicating said use condition of the identifier so that said data indicates that said identifier is in use when said identifier is allocated to said one of said plurality of controlled apparatuses.

5. The control device according to claim 1, wherein said control device further comprises storing means for storing data indicating a use condition of said identifier; and said deallocating means alters said data indicating said use condition of said identifier so that said data indicates that said identifier is not in use when said identifier allocated to said one of said plurality of controlled apparatuses is deallocated.

6. A control method of a control device for controlling a plurality of controlled apparatuses performing communications within a wireless network, comprising the steps of:

performing a node initialization process to form said wireless network by a second one of said plurality of controlled apparatuses when a first one of said plurality of controlled apparatuses receives a control block from said second one of said plurality of controlled apparatuses, and performing said mode initialization process to form said wireless network by said first one of said plurality of controlled apparatuses when said first one of said plurality of controlled apparatuses cannot receive said control block from said second one of said plurality of controlled apparatuses;

holding a predetermined number of identifiers to be allocated to any of said plurality of controlled apparatuses connected to said wireless network;

allocating an identifier not yet allocated among said identifiers held in said holding step to said one of said plurality of controlled apparatuses, when said one of said plurality of controlled apparatuses is newly connected to said wireless network on power-up; and deallocating said identifier allocated to said one of said plurality of controlled apparatuses when said one of said plurality of controlled apparatuses is removed from said wireless network on power-down.

7. The control method according to claim 6, wherein said identifier allocated to said one of said plurality of controlled apparatuses identifies a bus connected to said one of said plurality of controlled apparatuses.

8. The control method according to claim 6, wherein said identifier allocated to said one of said plurality of controlled apparatuses comprises a first identifier for identifying said one of said plurality of controlled apparatuses and a second identifier for identifying a bus connected to said one of said plurality of controlled apparatuses.

* * * * *